US010298575B2

(12) United States Patent
Castinado et al.

(10) Patent No.: US 10,298,575 B2
(45) Date of Patent: *May 21, 2019

(54) MULTICOMPUTER PROCESSING OF AN EVENT AUTHENTICATION REQUEST WITH CENTRALIZED EVENT ORCHESTRATION

(71) Applicant: Bank of America Corporation, Charlotte, NC (US)

(72) Inventors: Joseph Benjamin Castinado, Northglenn, CO (US); Akiva D. Kates, Charlotte, NC (US); Tracey Mochnal, Scotch Plains, NJ (US)

(73) Assignee: Bank of America Corporation, Charlotte, NC (US)

( * ) Notice: Subject to any disclaimer, the term of this patent is extended or adjusted under 35 U.S.C. 154(b) by 168 days.

This patent is subject to a terminal disclaimer.

(21) Appl. No.: 15/372,692

(22) Filed: Dec. 8, 2016

(65) Prior Publication Data

US 2018/0167390 A1     Jun. 14, 2018

(51) Int. Cl.
*G06F 1/26*     (2006.01)
*H04L 29/06*     (2006.01)
*G06F 16/951*     (2019.01)

(52) U.S. Cl.
CPC ........ *H04L 63/0876* (2013.01); *G06F 16/951* (2019.01); *H04L 63/083* (2013.01); *H04L 63/10* (2013.01); *H04L 63/1425* (2013.01); *H04L 2463/082* (2013.01)

(58) Field of Classification Search
CPC ............... G06Q 2220/10; G06Q 20/00; G06Q 30/0207; G06Q 30/018; H04W 12/06
See application file for complete search history.

(56) References Cited

U.S. PATENT DOCUMENTS

| 5,787,402 A | 7/1998 | Potter et al. |
| 6,247,000 B1 | 6/2001 | Hawkins et al. |
| 6,721,716 B1 | 4/2004 | Gross |
| 7,580,886 B1 | 8/2009 | Schulz |

(Continued)

*Primary Examiner* — Abiy Getachew
(74) *Attorney, Agent, or Firm* — Banner & Witcoff, Ltd.; Michael A. Springs

(57) ABSTRACT

Aspects of the disclosure relate to multicomputer processing of an event authentication request with centralized event orchestration. A computing platform may receive a request to authenticate an event. Subsequently, the computing platform may generate a first authentication dataset and receive a second authentication dataset. Then, the computing platform may calculate unauthorized access likelihood scores based on the first and second authentication datasets. Thereafter, the computing platform may calculate an event security score based on the unauthorized access likelihood scores. Subsequently, the computing platform may generate first event authentication commands. Next, the computing platform may send the first event authentication commands to an unauthorized access computing device. Then, the computing platform may receive a result of an unauthorized access analysis. Subsequently, the computing platform may generate, based on the result of the unauthorized access analysis, second event authentication commands. Thereafter, the computing platform may send the second event authentication commands.

20 Claims, 12 Drawing Sheets

(56) References Cited

U.S. PATENT DOCUMENTS

| | | |
|---|---|---|
| 7,689,483 B2 | 3/2010 | Wu et al. |
| 8,560,452 B2 | 10/2013 | Lynch et al. |
| 8,606,705 B2 | 12/2013 | Zanzot et al. |
| 8,620,805 B2 | 12/2013 | Davis et al. |
| 9,087,215 B2 * | 7/2015 | LaFever .............. G06F 21/6254 |
| 9,781,148 B2 * | 10/2017 | Mahaffey ............ H04L 63/1433 |
| 2010/0280949 A1 | 11/2010 | Van Rensburg |
| 2011/0282780 A1 | 11/2011 | French et al. |
| 2016/0182331 A1 | 6/2016 | Iannaccone et al. |
| 2016/0184701 A1 | 6/2016 | Weston et al. |
| 2016/0187654 A1 | 6/2016 | Border et al. |
| 2016/0188181 A1 | 6/2016 | Smith |
| 2016/0189299 A1 | 6/2016 | Chiulli et al. |
| 2016/0196553 A1 | 7/2016 | Barhydt |
| 2016/0196587 A1 | 7/2016 | Eder |
| 2016/0196608 A1 | 7/2016 | Chiulli et al. |
| 2016/0197993 A1 | 7/2016 | Perkowski et al. |
| 2016/0205174 A1 | 7/2016 | Pitio et al. |
| 2016/0209648 A1 | 7/2016 | Haddick et al. |
| 2016/0210224 A1 | 7/2016 | Cohen et al. |
| 2016/0210605 A1 | 7/2016 | Vaish et al. |
| 2016/0217258 A1 | 7/2016 | Pitroda et al. |
| 2016/0219152 A1 | 7/2016 | Fernandez et al. |
| 2016/0224951 A1 | 8/2016 | Hoffberg |
| 2016/0226308 A1 | 8/2016 | Valin et al. |
| 2016/0226836 A1 | 8/2016 | Garcia et al. |
| 2016/0240050 A1 | 8/2016 | Block et al. |
| 2016/0246616 A1 | 8/2016 | Kwong |
| 2016/0247148 A1 | 8/2016 | Jivan et al. |
| 2016/0253360 A1 | 9/2016 | Gradin et al. |
| 2016/0253650 A1 | 9/2016 | Cohen |
| 2016/0260067 A1 | 9/2016 | Holman et al. |
| 2016/0260069 A1 | 9/2016 | Holman et al. |
| 2016/0266939 A1 | 9/2016 | Shear et al. |
| 2016/0275558 A1 | 9/2016 | Tiku et al. |
| 2016/0275760 A1 | 9/2016 | Block et al. |
| 2016/0283923 A1 | 9/2016 | Hertel et al. |
| 2016/0291863 A1 | 10/2016 | Miron |
| 2016/0292683 A1 | 10/2016 | Song et al. |
| 2016/0292786 A1 | 10/2016 | Khizhnyak et al. |
| 2016/0292963 A1 | 10/2016 | Chun et al. |
| 2016/0300196 A1 | 10/2016 | Guido et al. |
| 2016/0300197 A1 | 10/2016 | Guido et al. |
| 2016/0300198 A1 | 10/2016 | Guido et al. |
| 2016/0300199 A1 | 10/2016 | Guido et al. |
| 2016/0300204 A1 | 10/2016 | Guido et al. |
| 2016/0306751 A1 | 10/2016 | Amarendran et al. |
| 2016/0306984 A1 | 10/2016 | Amarendran et al. |
| 2016/0314443 A1 | 10/2016 | Liberty |
| 2016/0314640 A1 | 10/2016 | Ward et al. |
| 2016/0321624 A1 | 11/2016 | Brunner |
| 2016/0328706 A1 | 11/2016 | Kennedy |
| 2016/0328723 A1 | 11/2016 | Cunnane |
| 2016/0342977 A1 | 11/2016 | Lam |
| 2016/0343081 A1 | 11/2016 | Somech et al. |
| 2016/0343094 A1 | 11/2016 | Forbes, Jr. |
| 2016/0343100 A1 | 11/2016 | Davenport et al. |
| 2016/0350856 A1 | 12/2016 | Sandhu et al. |

* cited by examiner

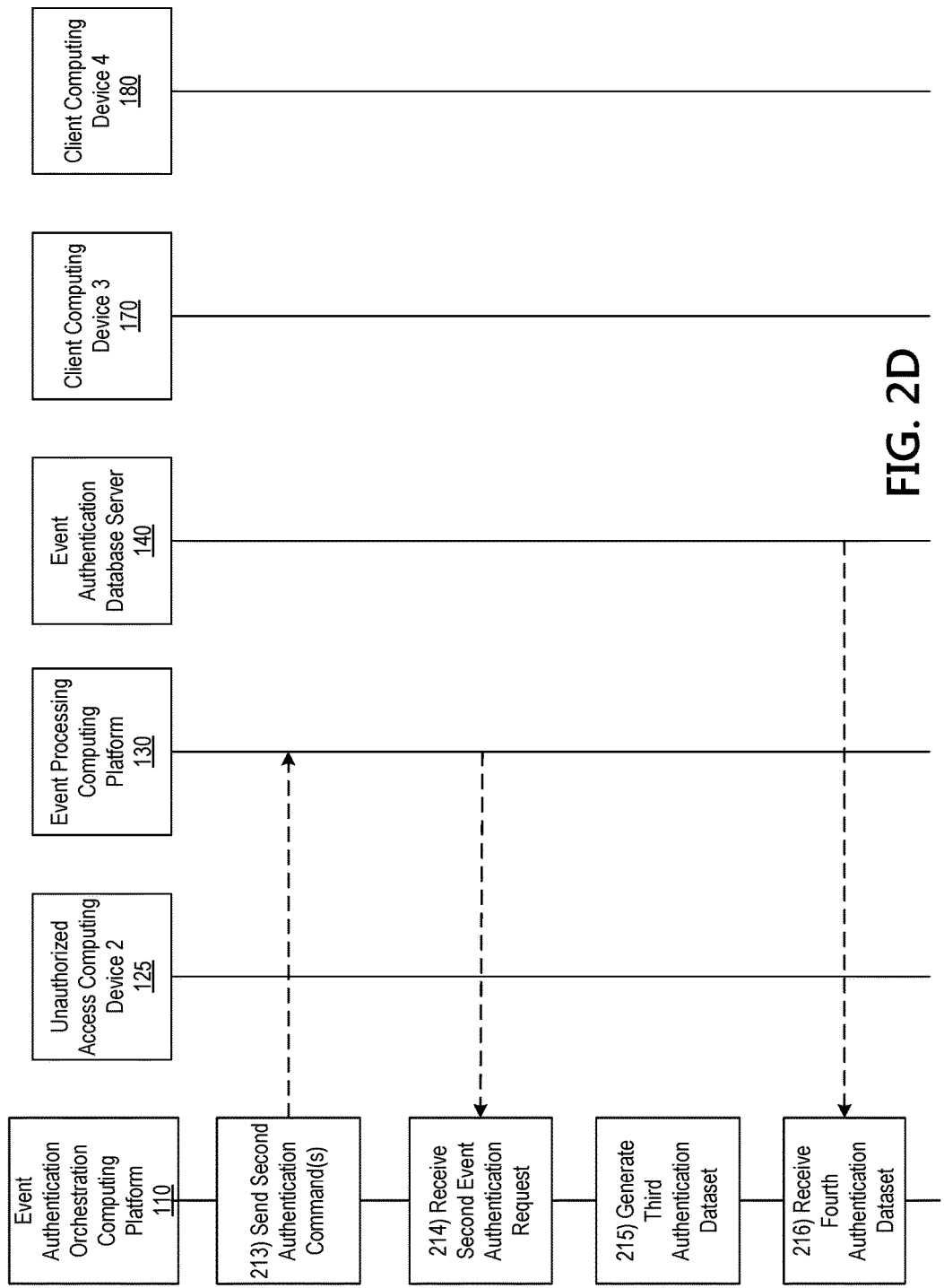

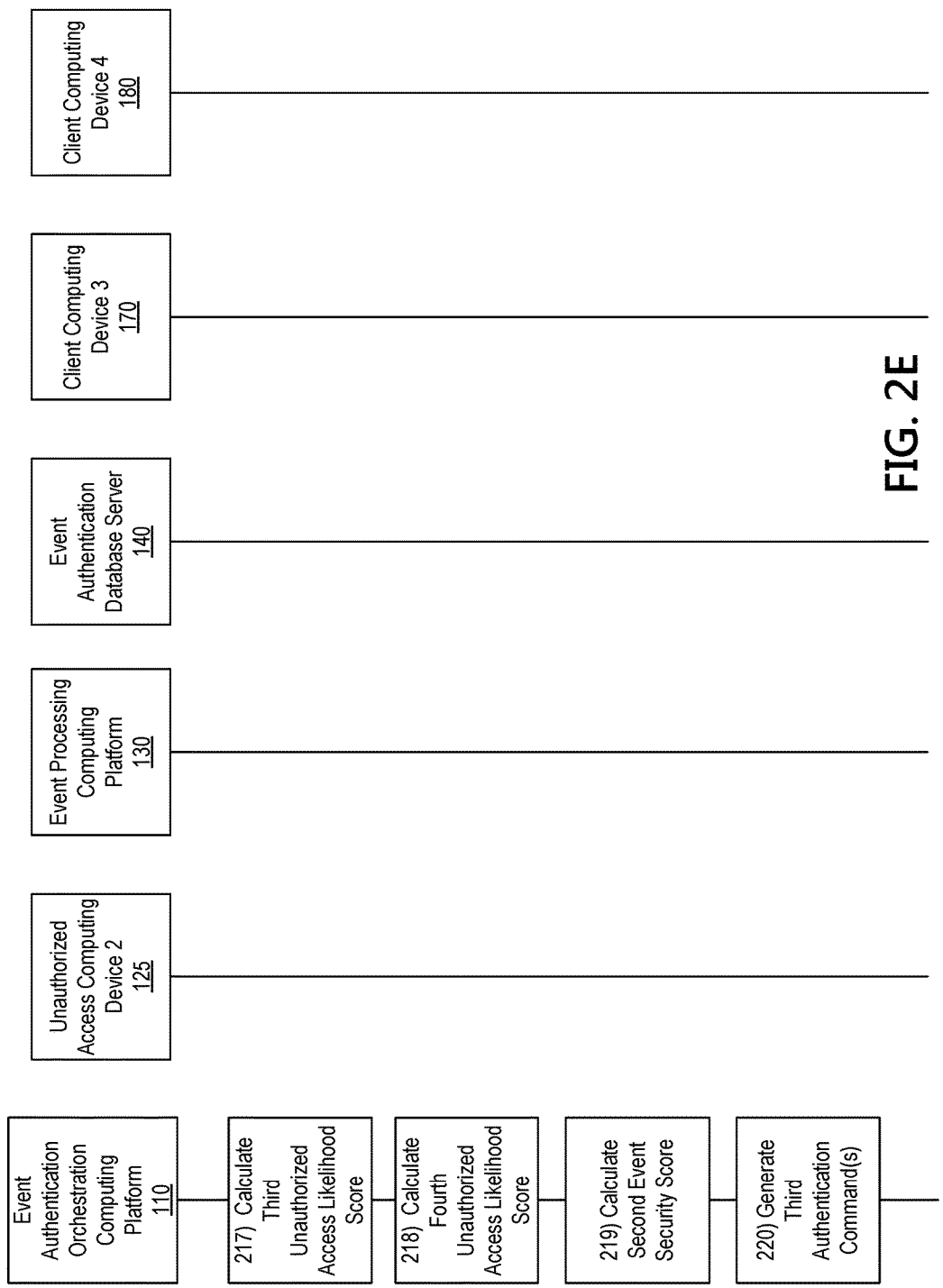

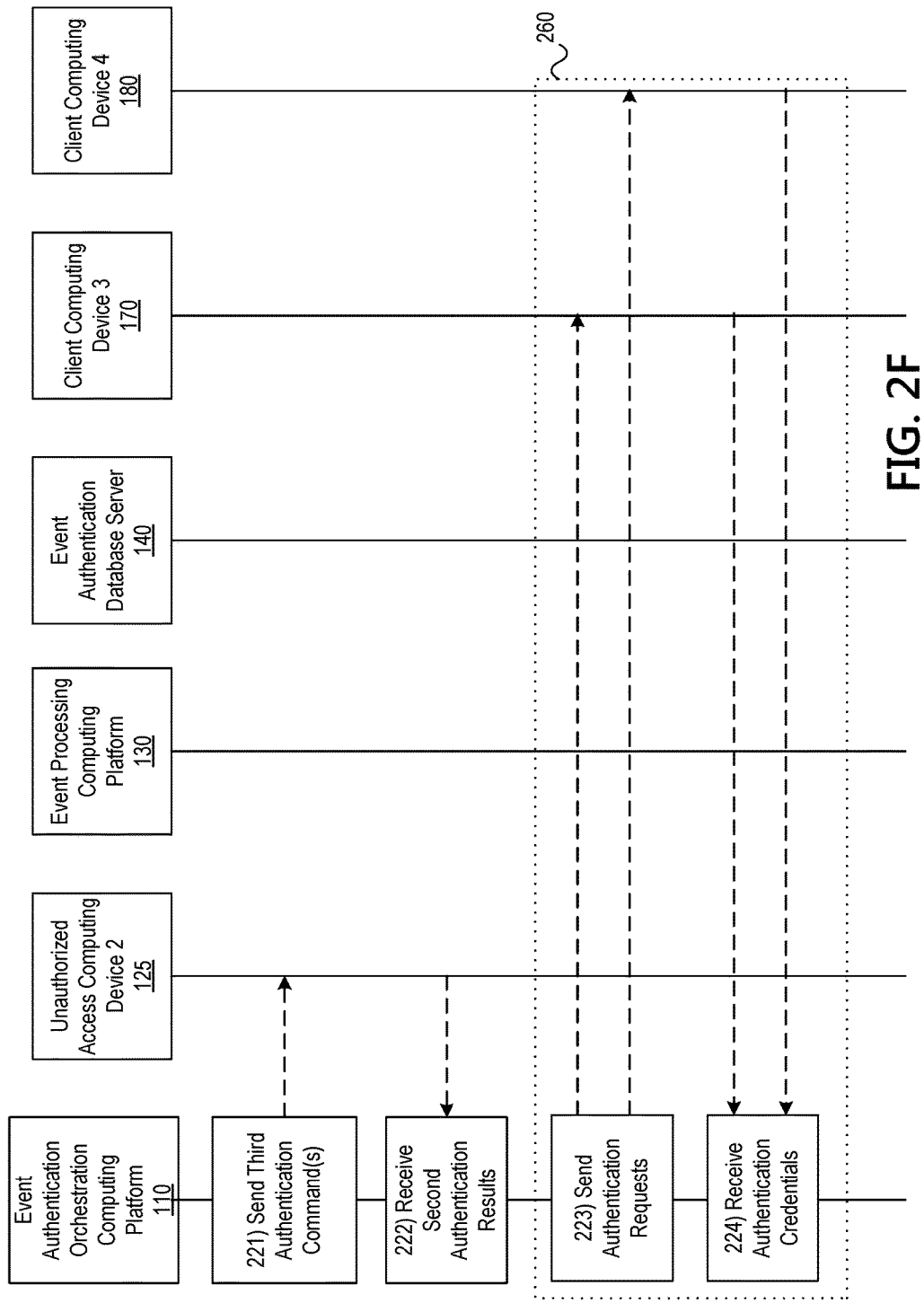

MULTICOMPUTER PROCESSING OF AN EVENT AUTHENTICATION REQUEST WITH CENTRALIZED EVENT ORCHESTRATION

BACKGROUND

Aspects of the disclosure relate to electrical computers, digital processing systems, and multicomputer data transferring. In particular, one or more aspects of the disclosure relate to multicomputer processing of an event authentication request with centralized event orchestration.

As computer systems are increasingly utilized to provide automated and electronic services, such computer systems may be utilized to access and modify sensitive data, and preventing unauthorized use of sensitive data is increasingly critical. In many instances, however, it may be difficult to prevent unauthorized use of sensitive data while also optimizing the efficient and effective technical operations of the computer systems that provide such automated and electronic services.

SUMMARY

Aspects of the disclosure provide effective, efficient, scalable, and convenient technical solutions that address and overcome the technical problems associated with preventing unauthorized access to sensitive data, and optimizing the efficient and effective technical operations of computer systems. In particular, one or more aspects of the disclosure provide techniques for preventing unauthorized use of data using multicomputer processing and centralized event orchestration to improve data management and enhance technical performance.

In accordance with one or more embodiments, a computing platform having at least one processor, a memory, and a communication interface may receive, via the communication interface, from an event processing computing platform, a first request to authenticate a first event between a first client computing device and a second client computing device. Then, the computing platform may generate, based on contents of the first request, a first authentication dataset, and the first authentication dataset may include first dynamic authentication data for the first client computing device and second dynamic authentication data for the second client computing device. Subsequently, the computing platform may receive, from an event authentication database, a second authentication dataset, and the second authentication dataset may include first historical authentication data for the first client computing device and second historical authentication data for the second client computing device. Thereafter, the computing platform may calculate a first unauthorized access likelihood score for the first client computing device based on the first dynamic authentication data for the first client computing device and the first historical authentication data for the first client computing device. Subsequently, the computing platform may calculate a second unauthorized access likelihood score for the second client computing device based on the second dynamic authentication data for the second client computing device and the second historical authentication data for the second client computing device. Then, the computing platform may calculate a first event security score for the first event based on the first unauthorized access likelihood score for the first client computing device and the second unauthorized access likelihood score for the second client computing device. Thereafter, the computing platform may generate, based on the first event security score, one or more first event authentication commands directing a first unauthorized access computing device to execute a first unauthorized access analysis. Then, the computing platform may send, via the communication interface, to the first unauthorized access computing device, the one or more first event authentication commands directing the first unauthorized access computing platform to execute the first unauthorized access analysis. Next, the computing platform may receive, via the communication interface, from the first unauthorized access computing device, a first result of the first unauthorized access analysis. Thereafter, the computing platform may generate, based on the first result of the first unauthorized access analysis, one or more second event authentication commands, wherein if the first result indicates that the first event is unauthorized, the one or more second event authentication commands direct the event processing computing platform to deny the first event, and if the first result and a first set of authentication credentials indicate that the first event is authorized, the one or more second event authentication commands direct the event processing computing platform to authorize the first event. Subsequently, the computing platform may send, via the communication interface, to the event processing computing platform, the one or more second event authentication commands.

In some embodiments, the first dynamic authentication data may comprise a first alias associated with the first client computing device and the second dynamic authentication data may comprise a second alias associated with the second client computing device. The second authentication dataset may comprise previously authenticated events between the first alias and the second alias, and/or between the first client computing device and the second client computing device. The first event security score may further be based on the previously authenticated events between the first alias and the second alias and/or between the first client computing device and the second client computing device.

In some embodiments, the first historical authentication data for the first client computing device may comprise a first set of events associated with the first alias and a second set of events associated with the first client computing device. Calculating the first unauthorized access likelihood score for the first client computing device may comprise assigning a first weight to the first set of events and a second weight to the second set of events, wherein the second weight is higher than the first weight.

In some embodiments, the generating, based on the first event security score, one or more first event authentication commands may comprise generating, responsive to a determination that the first event security score is above a first threshold, the one or more first event authentication commands.

In some embodiments, the computing platform may, prior to generating the one or more second event authentication commands and responsive to a determination that the first result indicates that the first event is authorized, send a first authentication credentials request to the first client computing device and send a second authentication credentials request to the second client computing device. Next, the computing platform may receive, in response to sending the first authentication credentials request, a first authentication credential from the first client computing device. Then, the computing platform may receive, in response to sending the second authentication credentials request, a second authentication credential from the second client computing device. The first set of authentication credentials may comprise the first authentication credential and the second authentication credential.

In some embodiments, the computing platform may validate the first set of authentication credentials by comparing contents of the first authentication credential and contents of the second authentication credentials with stored authentication data.

In some embodiments, the computing platform may receive, via the communication interface, from the event processing computing platform, a second request to authenticate a second event between a third client computing device and a fourth client computing device. Then, the computing platform may generate, based on contents of the second request, a third authentication dataset, and the third authentication dataset may include third dynamic authentication data for the third client computing device and fourth dynamic authentication data for the fourth client computing device. Thereafter, the computing platform may receive, from an event authentication database, a fourth authentication dataset, and the fourth authentication dataset may include third historical authentication data for the third client computing device and fourth historical authentication data for the fourth client computing device. Subsequently, the computing platform may calculate a third unauthorized access likelihood score for the third client computing device based on the third dynamic authentication data for the third client computing device and the third historical authentication data for the third client computing device. Then, the computing platform may calculate a fourth unauthorized access likelihood score for the fourth client computing device based on the fourth dynamic authentication data for the fourth client computing device and the fourth historical authentication data for the fourth client computing device. Thereafter, the computing platform may calculate a second event security score for the second event based on the third unauthorized access likelihood score for the third client computing device and fourth unauthorized access likelihood score for the fourth client computing device. Then, the computing platform may generate, based on the second event security score, one or more third event authentication commands directing a second unauthorized access computing device to execute a second unauthorized access analysis. Next, the computing platform may send, via the communication interface, to the second unauthorized access computing device, the one or more third event authentication commands directing the second unauthorized access computing platform to execute the second unauthorized access analysis. Subsequently, the computing platform may receive, via the communication interface, from the second unauthorized access computing device, a second result of the second unauthorized access analysis. Thereafter, the computing platform may generate, based on the second result of the second unauthorized access analysis, one or more fourth event authentication commands, wherein if the second result indicates that the second event is authorized, the one or more fourth event authentication commands direct the event processing computing platform to authorize the second event and if the second result and a second set of authentication credentials indicate that the second event is unauthorized, the one or more fourth event authentication commands direct the event processing computing platform to deny the second event. Then, the computing platform may send, via the communication interface, to the event processing computing platform, the one or more fourth event authentication commands.

In some embodiments, the third dynamic authentication data may comprise a first alias associated with the third client computing device and the fourth dynamic authentication data may comprise a second alias associated with the fourth client computing device. The third authentication dataset may further comprise previously authenticated events between the first alias and the second alias and/or between the third client computing device and the fourth client computing device. The second event security score may further be based on the previously authenticated events between the first alias and the second alias and/or between the third client computing device and the fourth client computing device.

In some embodiments, the first historical authentication data for the third client computing device may comprise a first set of events associated with the first alias and a second set of events associated with the third client computing device. Calculating the third unauthorized access likelihood score for the third client computing device may comprise assigning a first weight to the first set of events and a second weight to the second set of events, wherein the second weight is higher than the first weight In some embodiments, the generating, based on the second event security score, one or more third event authentication commands may comprise generating, responsive to a determination that the second event security score is above a first threshold, the one or more third event authentication commands.

In some embodiments, the computing platform may send a first authentication credentials request to the third client computing device. Next, the computing platform may send a second authentication credentials request to the fourth client computing device. Thereafter, the computing platform may receive, in response to sending the first authentication credentials request, a first authentication credential from the third client computing device. Then, the computing platform may receive in response to sending the second authentication credentials request, a second authentication credential from the fourth client computing device. The second set of authentication credentials may comprise the first authentication credential and the second authentication credential.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for multicomputer processing of an event authentication request with centralized event orchestration in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to authenticating, in response to receiving an event authentication request, a first requested event between a first client computing device and a second client computing device. The client computing device may be associated with a customer of a financial institution. The first client computing device may be associated with a first alias and the second client computing device may be associated with a second alias. Determination of whether the first requested event is to be processed or denied may be determined at least in part on dynamic authentication information and historical authentication information. The dynamic authentication information and/or the historical authentication information may include information about the first client computing device, the second client computing device, the first alias, and the second alias.

Figure 1A:
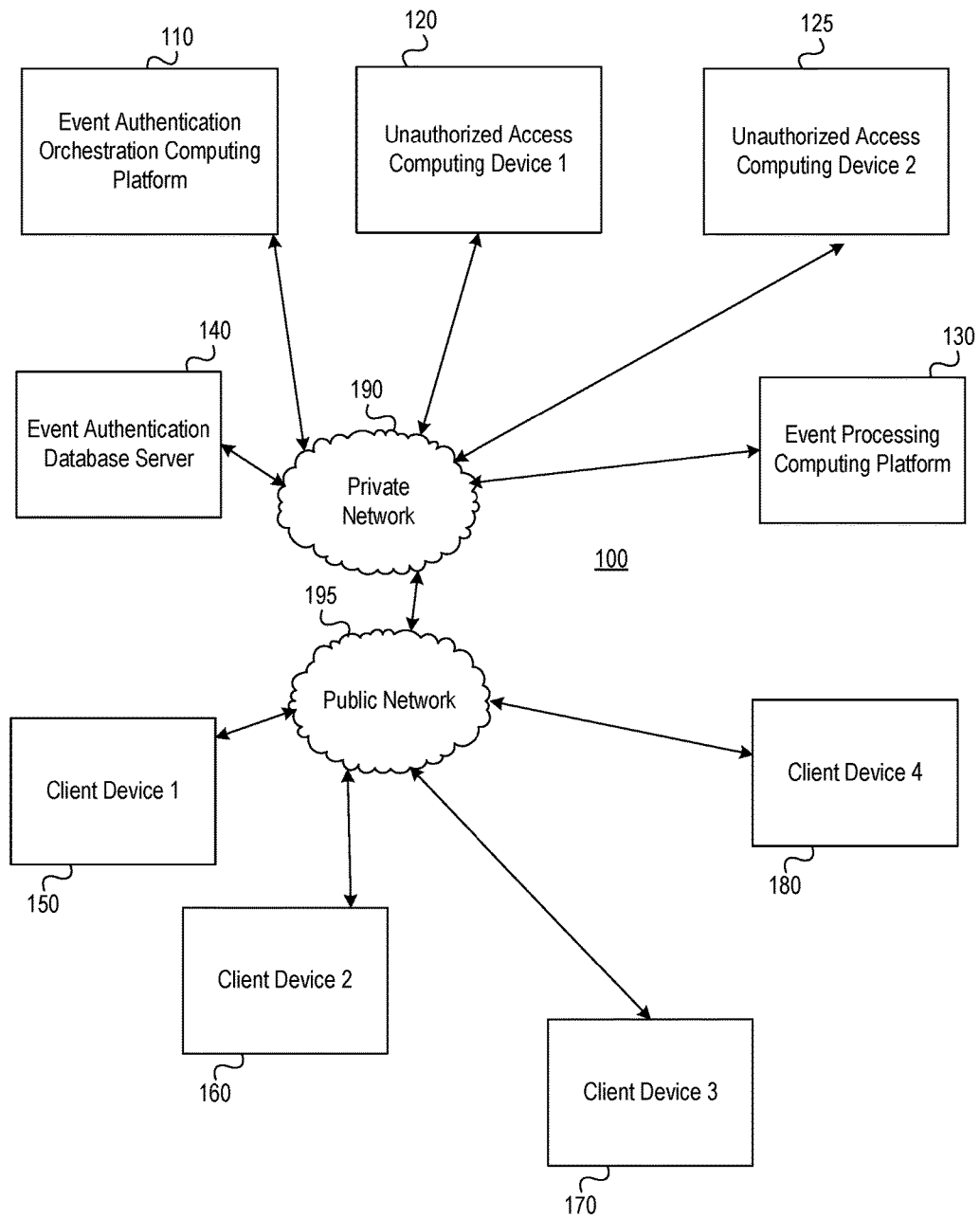
FIGS. 1A and 1B depict an illustrative computing environment for multicomputer processing of an event authentication request with centralized event orchestration in accordance with one or more example embodiments.
Figure 1B:
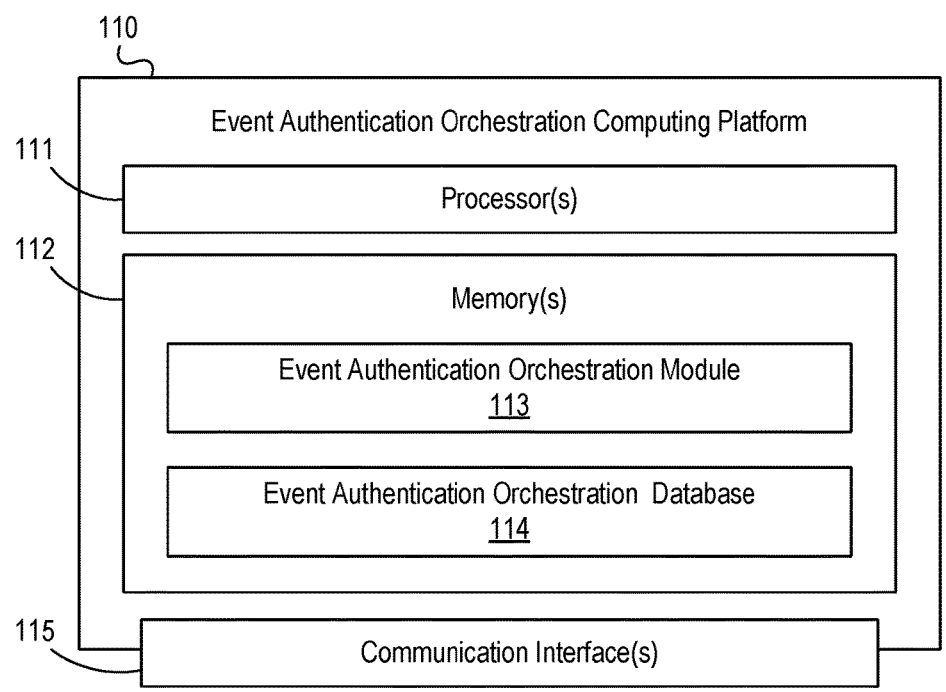

FIGS. 1A and 1B depict an illustrative computing environment for multicomputer processing of an event authentication request with centralized event orchestration in accordance with one or more example embodiments. Referring to FIG. 1A, computing environment 100 may include one or more computing devices and/or other computer systems. For example, computing environment 100 may include an event authentication orchestration computing platform 110, unauthorized access computing device 120, unauthorized access computing device 125, event processing computing platform 130, event authentication database server 140, client computing device 150, client computing device 160, client computing device 170, and client computing device 180.

Event authentication orchestration computing platform 110 may be configured to authenticate events that are requested by one or more client computing devices, control and/or direct actions of other devices and/or computer systems (e.g., in authenticating events that are defined and/or requested by one or more client computing devices and/or in performing other actions), and/or perform other functions, as discussed in greater detail below. For example, event authentication orchestration computing platform 110 may be operated by and/or otherwise associated with a particular organization (e.g., a financial institution) and may, in some instances, be configured to authenticate one or more events (e.g., payments transactions, including cross-border payment transactions and/or cross-currency payment transactions). Unauthorized access computing device 120 and unauthorized access computing device 125 may each be configured to perform risk analysis on events that are requested by one or more client computing devices. The type of risk analysis performed by unauthorized access computing device 120 and unauthorized access computing device 125 may be the same or different, and the algorithms used by unauthorized access computing device 120 and unauthorized access computing device 125 in performing such analysis may be dynamically modified.

Event processing computing platform 130 may be configured to receive one or more event requests from one or more of client computing device 150, client computing device 160, client computing device 170, and client computing device 180. Event processing computing platform 130 may further be configured to generate one or more event authentication requests for each of the event requests received from client computing device 150, client computing device 160, client computing device 170, and client computing device 180. Event processing computing platform 130 may further be configured to send the generated event authentication requests to event authentication orchestration computing platform 110. Event processing computing platform 130 may further be configured to receive one or more authentication commands from event authentication orchestration computing platform 110. Event processing computing platform 130 may process or deny one or more event requests based on the event authentication commands received from event authentication orchestration computing platform 110.

Event authentication database server 140 may be configured to store, maintain, and/or otherwise provide an event authentication database. Client computing device 150 may be configured to be used by a first customer of an organization, such as a commercial client, treasury client, or individual client of a financial institution. In some instances, client computing device 150 may, for example, be registered with the organization and/or one or more computer systems in computing environment 100, such that the organization and/or the one or more computer systems maintain one or more records linking client computing device 150 to the first customer of the organization. Client computing device 160 may be configured to be used by a second customer of the organization (which may, e.g., be different from the first customer of the organization). In some instances, client computing device 160 may, for example, be registered with the organization and/or one or more computer systems in computing environment 100, such that the organization and/or the one or more computer systems maintain one or more records linking client computing device 160 to the second customer of the organization. Client computing device 170 may be configured to be used by a third customer of the organization (which may, e.g., be different from the first customer and/or second customer of the organization). In some instances, client computing device 170 may, for example, be registered with the organization and/or one or more computer systems in computing environment 100, such that the organization and/or the one or more computer systems maintain one or more records linking client computing device 170 to the third customer of the organization. Client computing device 180 may be configured to be used by a fourth customer of the organization (which may, e.g., be different from the first customer, second customer, and/or third customer of the organization). In some instances, client computing device 180 may, for example, be registered with the organization and/or one or more computer systems in computing environment 100, such that the organization and/or the one or more computer systems maintain one or more records linking client computing device 180 to the fourth customer of the organization. In a first scenario, client computing device 150 may be used by a client to initiate a first payment transaction event, and client computing device 160 may be configured to receive the first payment transaction. Further in the first scenario, client computing device 170 may be used by a second client to initiate a second payment transaction event, and client computing device 180 may be configured to receive the second payment.

In one or more arrangements, unauthorized access computing device 120, unauthorized access computing device 125, event processing computing platform 130, event authentication database server 140, client computing device 150, client computing device 160, client computing device 170, and client computing device 180 may be any type of computing device capable of receiving a user interface, receiving input via the user interface, and communicating the received input to one or more other computing devices. For example, unauthorized access computing device 120, unauthorized access computing device 125, event processing computing platform 130, event authentication database server 140, client computing device 150, client computing device 160, client computing device 170, and client computing device 180 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of unauthorized access computing device 120, unauthorized access computing device 125, event processing computing platform 130, event authentication database server 140, client computing device 150, client computing device 160, client computing device 170, and client computing device 180 may, in some instances, be special-purpose computing devices configured to perform specific functions.

Computing environment 100 also may include one or more computing platforms. For example, and as noted above, computing environment 100 may include event authentication orchestration computing platform 110. As illustrated in greater detail below, event authentication orchestration computing platform 110 may include one or more computing devices configured to perform one or more of the functions described herein. For example, event authentication orchestration computing platform 110 may include one or more computers (e.g., laptop computers, desktop computers, servers, server blades, or the like).

Computing environment 100 also may include one or more networks, which may interconnect one or more of event authentication orchestration computing platform 110, unauthorized access computing device 120, unauthorized access computing device 125, event processing computing platform 130, event authentication database server 140, client computing device 150, client computing device 160, client computing device 170, and client computing device 180. For example, computing environment 100 may include private network 190 and public network 195. Private network 190 and/or public network 195 may include one or more sub-networks (e.g., local area networks (LANs), wide area networks (WANs), or the like). Private network 190 may be associated with a particular organization (e.g., a corporation, financial institution, educational institution, governmental institution, or the like) and may interconnect one or more computing devices associated with the organization. For example, event authentication orchestration computing platform 110, unauthorized access computing device 120, unauthorized access computing device 125, event authentication database server 140, and event processing computing platform 130 may be associated with an organization (e.g., a financial institution), and private network 190 may be associated with and/or operated by the organization, and may include one or more networks (e.g., LANs, WANs, virtual private networks (VPNs), or the like) that interconnect event authentication orchestration computing platform 110, unauthorized access computing device 120, unauthorized access computing device 125, event authentication database server 140, and event processing computing platform 130 and one or more other computing devices and/or computer systems that are used by, operated by, and/or otherwise associated with the organization. Public network 195 may connect private network 190 and/or one or more computing devices connected thereto (e.g., event authentication orchestration computing platform 110, unauthorized access computing device 120, unauthorized access computing device 125, event authentication database server 140, and event processing computing platform 130) with one or more networks and/or computing devices that are not associated with the organization. For example, client computing device 150, client computing device 160, client computing device 170, and client computing device 180 might not be associated with an organization that operates private network 190 (e.g., because client computing device 150, client computing device 160, client computing device 170, and client computing device 180 may be owned, operated, and/or serviced by one or more individuals and/or one or more entities different from the organization that operates private network 190, such as one or more customers of the organization and/or vendors of the organization, rather than being owned and/or operated by the organization itself or an employee or affiliate of the organization), and public network 195 may include one or more networks (e.g., the internet) that connect client computing device 150, client computing device 160, client computing device 170, and client computing device 180 to private network 190 and/or one or more computing devices connected thereto (e.g., event authentication orchestration computing platform 110, unauthorized access computing device 120, unauthorized access computing device 125, event authentication database server 140, and event processing computing platform 130).

Referring to FIG. 1B, event authentication orchestration computing platform 110 may include one or more processors 111, memory 112, and communication interface 115. A data bus may interconnect processor(s) 111, memory 112, and communication interface 115. Communication interface 115 may be a network interface configured to support communication between event authentication orchestration computing platform 110 and one or more networks (e.g., private network 190, public network 195, or the like). Memory 112 may include one or more program modules having instructions that when executed by processor(s) 111 cause event authentication orchestration computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of event authentication orchestration computing platform 110 and/or by different computing devices that may form and/or otherwise make up event authentication orchestration computing platform 110. For example, memory 112 may have, store, and/or include an event authentication orchestration module 113 and an event authentication orchestration database 114. Event authentication orchestration module 113 may have instructions that direct and/or cause event authentication orchestration computing platform 110 to orchestrate one or more authentication events involving one or more other computing devices and/or computer systems in computing environment 100 and/or perform other functions, as discussed in greater detail below. Event authentication orchestration database 114 may store information used by event authentication orchestration module 113 and/or event authentication orchestration computing platform 110 in authenticating one or more events involving one or more other computing devices and/or computer systems in computing environment 100 and/or in performing other functions.

Figure 2A:
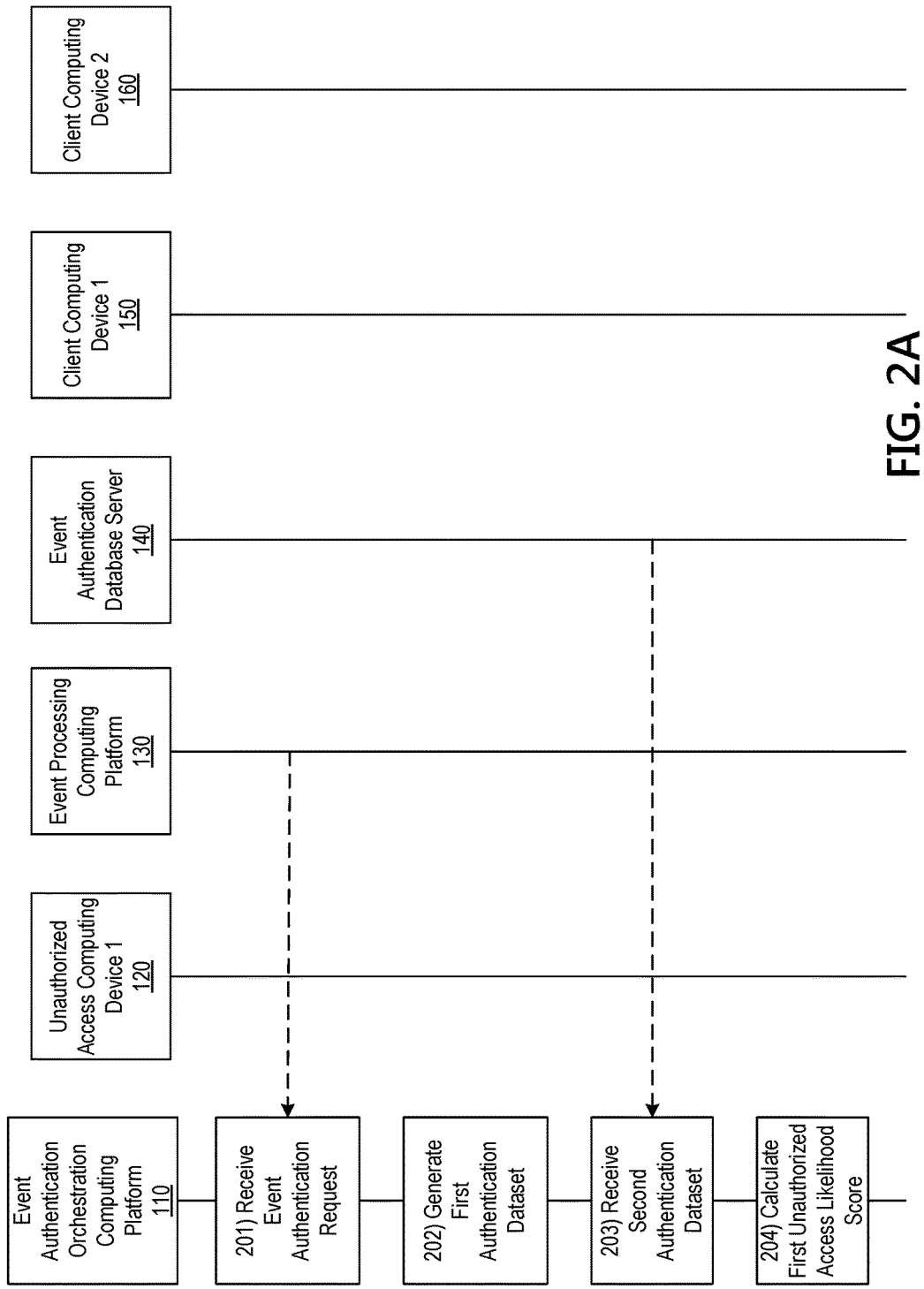

FIGS. 2A-2G depict an illustrative event sequence for multicomputer processing of an event authentication request with centralized event orchestration in accordance with one or more example embodiments. Referring to FIG. 2A, at step 201, event authentication orchestration computing platform 110 may receive an event authentication request from event processing computing platform 130. For example, event authentication orchestration computing platform 110 may receive a first event authentication request to authenticate a first event between client computing device 150 and client computing device 160. Event authentication orchestration computing platform 110 may be operated by and/or otherwise associated with a particular organization (e.g., a financial institution) and may, in some instances, be configured to authenticate one or more events (e.g., payments transactions, including cross-border payment transactions and/or cross-currency payment transactions) between client devices, such as client computing device 150 and client computing device 160. In one scenario, the first event may be a payment transaction between client computing device 150 and client computing device 160, wherein client computing device 150 has requested to make a payment to client computing device 160.

At step 202, event authentication orchestration computing platform 110 may generate a first authentication dataset based on contents of the first event authentication request received from event processing computing platform 130. For example, event authentication orchestration computing platform 110 may generate a first dynamic authentication dataset for client computing device 150 based on contents of the first event authentication request received from event processing computing platform 130, a second dynamic authentication dataset for client computing device 160 based on contents of the first event authentication request received from event processing computing platform 130, and third dynamic authentication dataset for the first event based on contents of the first event authentication request received from event processing computing platform 130. The first event authentication request received from event processing computing platform 130 may include multiple sets of data.

The first event authentication request received from event processing computing platform 130 may include a first dataset storing information associated with client computing device 150. As noted above, client computing device 150 may be associated with a first alias, and information identifying the first alias may be stored in the first dataset. Event authentication orchestration computing platform 110 may extract this information from the first dataset of the first event authentication request and store it in the first dynamic authentication dataset. Additionally, the Internet Protocol (IP) address and/or global positioning system (GPS) coordinates of client computing device 150 may be stored in the first dataset. Event authentication orchestration computing platform 110 may store the IP address and/or GPS coordinates of client computing device 150 in the first dynamic authentication dataset. In other embodiments, the make and/or model information for client computing device 150 may additionally or alternatively be extracted from the first dataset of the first event authentication request and stored in the first dynamic authentication dataset.

The first event authentication request received from event processing computing platform 130 may additionally include a second dataset storing information associated with client computing device 160. As noted above, client computing device 160 may be associated with a second alias, and information identifying the second alias may be stored in the second dataset. Event authentication orchestration computing platform 110 may extract this information from the second dataset of the first event authentication request and store it in the second dynamic authentication dataset. Additionally, the IP address and/or GPS coordinates of client computing device 160 may be stored in the second dataset. Event authentication orchestration computing platform 110 may store the IP address and/or GPS coordinates of client computing device 160 in the second dynamic authentication dataset. In other embodiments, the make and/or model information for client computing device 160 may additionally or alternatively be extracted from the second dataset of the first event authentication request and stored in the second dynamic authentication dataset.

The first event authentication request received from event processing computing platform 130 may include a third dataset storing information related to the first event. The third dataset may include information identifying the date of the first event (e.g., the date the payment transaction between client computing device 150 and client computing device 160 was initiated), information identifying the source of the payment (for example, one or more accounts associated with the first alias and/or client computing device 150), information identifying the destination of the payment (for example, one or more accounts associated with client computing device 160 or one or more aliases associated with client computing device 160), and other relevant information (for example, the amount of the payment transaction). Event authentication orchestration computing platform 110 may extract this information from the third dataset of the first event authentication request and store it in the third dynamic authentication dataset.

At step 203, event authentication orchestration computing platform 110 may receive a second authentication dataset from event authentication database server 140. For example, event authentication orchestration computing platform 110 may receive a second authentication dataset comprising first historical authentication information for client computing device 150 and second historical authentication information for client computing device 160. Event authentication database server 140 may store historical information for one or more client computing devices.

The first historical authentication information for client computing device 150 may include multiple datasets associated with client computing device 150 and/or the first alias associated with client computing device 150. For example, the first historical authentication information may store a transaction history for client computing device 150 and/or the first alias. The transaction history may include a list of all previously authenticated events associated with client computing device 150 and/or the first alias. The previously authenticated events associated with client computing device 150 and/or the first alias may include any payment transactions initiated by client computing device 150 (and/or the first alias) and/or any payment transactions received by client computing device 150 (and/or the first alias) that were processed by event authentication orchestration computing platform 110. The previously authenticated events associated with client computing device 150 and/or the first alias may include events that were denied by event authentication orchestration computing platform 110 and/or events that were approved by event authentication orchestration computing platform 110.

The transaction history for client computing device 150 may include, for each previously authenticated event associated with client computing device 150 and/or the first alias, an indication of whether event authentication orchestration computing platform 110 denied or approved that previously authenticated event. The transaction history for each previously authenticated event for which client computing device 150 was the originating device may include a transaction amount of that previously authenticated event, a source for that previously authenticated event (e.g., the account from which the payment was made and/or the user alias associated with the account), the destination for that previously authenticated event (e.g., a recipient client device, an alias associated with the recipient client device, the IP address and/or GPS coordinates of the recipient client device, and/or an account to which the payment was made), and the IP address of client computing device 150 at the time of that previously authenticated event. The transaction history for each previously authenticated event for which client computing device 150 was the recipient device may include a transaction amount of that previously authenticated event, a source for that previously authenticated event (e.g., an originating client device, the IP address and/or GPS coordinates of the originating client device, an alias associated with the originating client device, and/or an account from which the payment was made), the destination for that previously authenticated event (e.g., the account to which the payment was made and/or an alias associated with the account), and the IP address and/or GPS coordinates of client computing device 150 at the time of that previously authenticated event.

The first historical authentication information may further store one or more first operation records for client computing device 150 and the first alias. The one or more first operation records may log irregular operations related to client computing device 150 and/or the first alias. As noted above, client computing device 150 may be associated with a first alias. The first alias may be an email address, a mobile telephone number, a social networking handle, and/or the like. For example, if a user of client computing device 150 modifies the first alias (for example, by modifying the email address), this operation may be logged within the historical information for client computing device 150 in event authentication database server 140 by event processing computing platform 130. In another example, if a user of client computing device 150 associates client computing device 150 with a new user alias, this operation may be logged within the historical information for client computing device 150 in event authentication database server 140 by event processing computing platform 130 or event authentication orchestration computing platform 110.

Irregular operations within the transaction history for client computing device 150 may also be stored in the one or more first operation records for client computing device 150. For example, as stated above, the transaction history for client computing device 150 may include, for each previously authenticated event, a payment transaction amount, a source account (or alias associated with the source account), a destination account (or alias associated with the destination account), and IP addresses and/or GPS coordinates of the originating and recipient devices. Event authentication orchestration computing platform 110 may recurrently analyze the transaction history for client computing device 150 and store irregular operations in the one or more first operation records for client computing device 150. For example, if client computing device 150 initiated a payment transaction for a payment amount that was substantially greater than previous payment amounts for client computing device 150, event authentication orchestration computing platform 110 may store the payment transaction and associated data in the one or more first operation records for client computing device 150. In another example, if the source account (or associated alias) for a payment transaction originating from client computing device 150 had not previously been a source for payment transaction events originating from client computing device 150, event authentication orchestration computing platform 110 may log the payment transaction and associated data in the one or more first operation records for client computing device 150. In a different example, if the destination account (or associated alias) for a payment transaction received by client computing device 150 had not previously been a destination for payment transaction events received by client computing device 150, event authentication orchestration computing platform 110 may log the payment transaction and associated data in the one or more first operation records for client computing device 150. In another example, if the IP address of client computing device 150 while client computing device 150 is requesting to make or receive a payment transaction is different than a usual IP address utilized by client computing device 150, event authentication orchestration computing platform 110 may log the payment transaction and associated data in the one or more first operation records for client computing device 150.

The second historical authentication information for client computing device 160 may include multiple datasets associated with client computing device 160 and/or the second alias associated with client computing device 160. For example, the second historical authentication information may store a transaction history for client computing device 160 and the second alias. The transaction history may include a list of all previously authenticated events associated with client computing device 160 and/or the second alias. The previously authenticated events associated with client computing device 160 and/or the second alias may include any payment transactions initiated by client computing device 160 (and/or the second alias) and/or any payment transactions received by client computing device 160 (and/or the second alias) that were processed by event authentication orchestration computing platform 110. The previously authenticated events associated with client computing device 160 and/or the second alias may include events that were denied by event authentication orchestration computing platform 110 and/or events that were approved by event authentication orchestration computing platform 110.

The transaction history for client computing device 160 may include, for each previously authenticated event associated with client computing device 160 and/or the second alias, an indication of whether event authentication orchestration computing platform 110 denied or approved that previously authenticated event. The transaction history for each previously authenticated event for which client computing device 160 was the originating device may include a transaction amount of that previously authenticated event, a source for that previously authenticated event (e.g., the account from which the payment was made and/or the user alias associated with the account), the destination for that previously authenticated event (e.g., a recipient client device, an alias associated with the recipient client device, the IP address and/or GPS coordinates of the recipient client device, and/or an account to which the payment was made), and the IP address and/or GPS coordinates of client computing device 160 at the time of that previously authenticated event. The transaction history for each previously authenticated event for which client computing device 160 was the recipient device may include a transaction amount of that previously authenticated event, a source for that previously authenticated event (e.g., an originating client device, the IP address and/or GPS coordinates of the originating client device, an alias associated with the originating client device, and/or an account from which the payment was made), the destination for that previously authenticated event (e.g., the account to which the payment was made and/or an alias associated with the account), and the IP address and/or GPS coordinates of client computing device 160 at the time of that previously authenticated event.

The second historical authentication information may further store one or more second operation records for client computing device 160 and the second alias. The one or more second operation records may log irregular operations related to client computing device 160 and/or the second alias. As noted above, client computing device 160 may be associated with a second alias. The second alias may be an email address, a mobile telephone number, a social networking handle, and/or the like. For example, if a user of client computing device 160 modifies the second alias (for example, by modifying the email address), this operation may be logged within the historical information for client computing device 160 in event authentication database server 140 by event processing computing platform 130. In another example, if a user of client computing device 160 associates client computing device 160 with a new user alias, this operation may be logged within the historical information for client computing device 160 in event authentication database server 140 by event processing computing platform 130 or event authentication orchestration computing platform 110.

Irregular operations within the transaction history for client computing device 160 may also be stored in the one or more second operation records for client computing device 160. For example, as stated above, the transaction history for client computing device 160 may include, for each previously authenticated event, a payment transaction amount, a source account (or alias associated with the source account), a destination account (or alias associated with the destination account), and IP addresses and/or GPS coordinates of the originating and recipient devices. Event authentication orchestration computing platform 110 may recurrently analyze the transaction history for client computing device 160 and store irregular operations in the one or more second operation records for client computing device 160. For example, if client computing device 160 initiated a payment transaction for a payment amount that was substantially greater than previous payment amounts for client computing device 160, event authentication orchestration computing platform 110 may store the payment transaction and associated data in the one or more second operation records for client computing device 160. In another example, if the source account (or associated alias) for a payment transaction originating from client computing device 160 had not previously been a source for payment transaction events originating from client computing device 160, event authentication orchestration computing platform 110 may log the payment transaction and associated data in the one or more second operation records for client computing device 160. In a different example, if the destination account (or associated alias) for a payment transaction received by client computing device 160 had not previously been a destination for payment transaction events received by client computing device 160, event authentication orchestration computing platform 110 may log the payment transaction and associated data in the one or more second operation records for client computing device 160. In another example, if the IP address of client computing device 160 while client computing device 160 is requesting to make or receive a payment transaction is different than a usual IP address utilized by client computing device 160, event authentication orchestration computing platform 110 may log the payment transaction and associated data in the one or more second operation records for client computing device 160.

At step 204, event authentication orchestration computing platform 110 may calculate a first unauthorized access likelihood score. For example, event authentication orchestration computing platform 110 may calculate a first unauthorized access likelihood score for client computing device 150 based on the first dynamic authentication dataset, the third dynamic authentication dataset, and the first historical authentication dataset. In calculating the first unauthorized access likelihood score, event authentication orchestration computing platform 110 may first analyze the contents of the first historical authentication information. That is, event authentication orchestration computing platform 110 may evaluate the contents of the first historical authentication information to determine a likeliness that client computing device 150 and/or the first alias has been comprised by unauthorized access. For example, as noted above, the one or more first operation records in the first historical authentication information may store irregular or unusual activities detected in association with client computing device 150 and/or the first alias. Each of the entries in the one or more first operation records may be assigned different weights. Event authentication orchestration computing platform 110 may dynamically determine the weights to be assigned to each of the entries in the one or more first operation records, or these weights may be predetermined. In one scenario, event authentication orchestration computing platform 110 may assign higher weights to entries associated with client computing device 150 and lower weights to entries associated with the first alias. For example, event authentication orchestration computing platform 110 may give higher weight to an entry in the one or more first operation records indicating that a recent payment transaction for an unusually high amount of funds than an entry in the one or more first operation records indicating that the first alias was recently modified. Additionally, each of the entries in the one or more first operation records may have a timestamp, and event authentication orchestration computing platform 110 may gradually decrease the weights of older entries. Event authentication orchestration computing platform 110 may calculate a preliminary unauthorized access likelihood score for client computing device 150 based on the logged entries in the one or more first operation records in the first historical authentication information utilizing the weights assigned to each of the entries.

In calculating the first unauthorized access likelihood score, event authentication orchestration computing platform 110 may further compare contents of the first dynamic authentication dataset and the third dynamic authentication dataset with the contents of the first historical authentication information. In comparing the contents of the first dynamic authentication dataset and the third dynamic authentication dataset with the contents of the first historical authentication information, event authentication orchestration computing platform 110 may determine whether the parameters of the first event (transaction amount, source account/alias information, destination account/alias information, IP address, GPS coordinates) are tracking the parameters of the unusual payment transaction entries in the one or more first operation records stored in the first historical authentication information, or whether the parameters of the first event track the usual payment transaction entries in the transaction history stored in the first historical authentication information. Event authentication orchestration computing platform 110 may then adjust the preliminary unauthorized access likelihood score calculated for client computing device 150 based on a result of the comparison of the contents of the first dynamic authentication dataset and the third dynamic authentication dataset with the contents of the first historical authentication information.

Figure 2B:
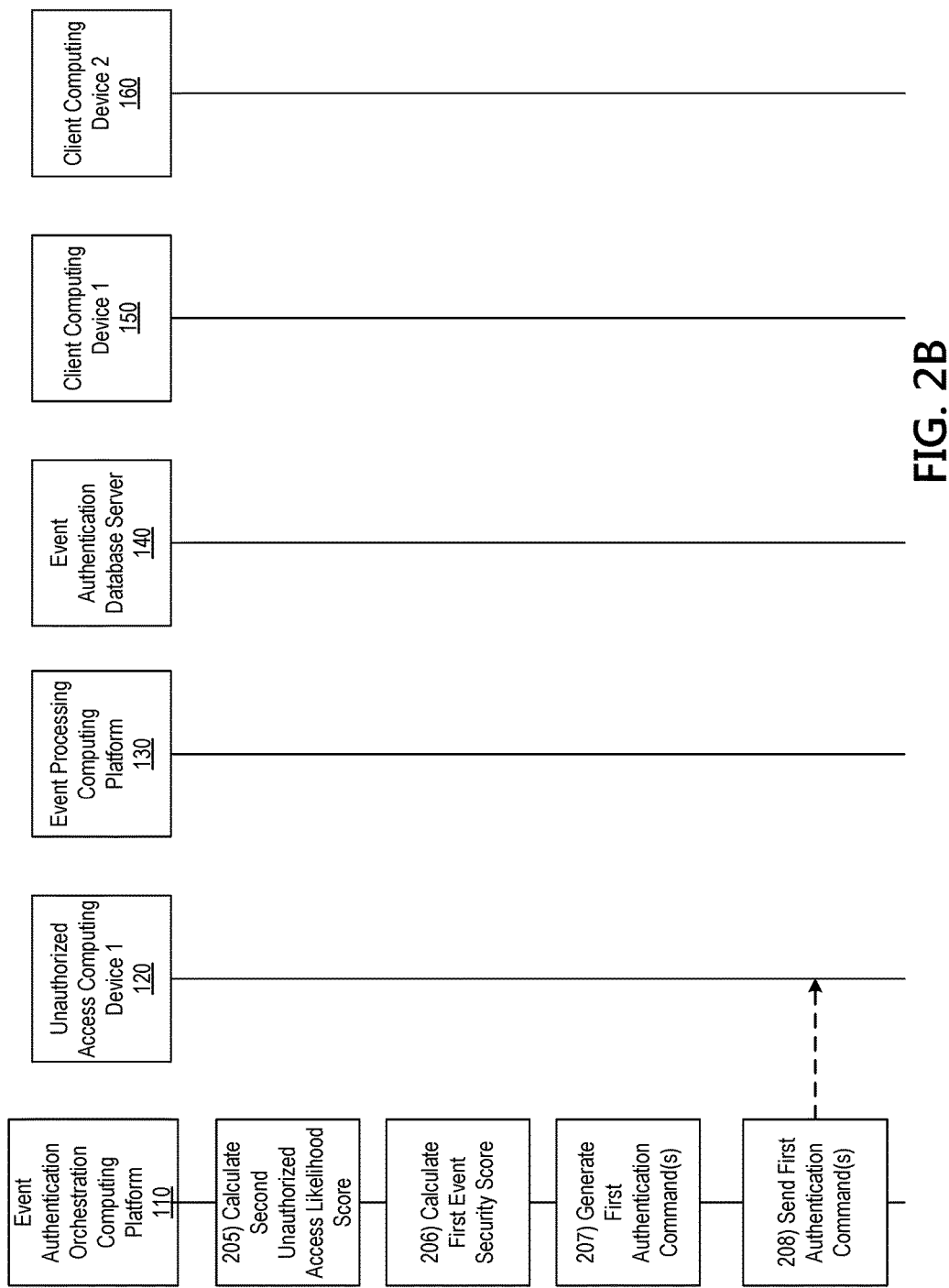

Referring to FIG. 2B, at step 205, event authentication orchestration computing platform 110 may calculate a second unauthorized access likelihood score. For example, event authentication orchestration computing platform 110 may calculate a second unauthorized access likelihood score for client computing device 160 based on the second dynamic authentication dataset, the third dynamic authentication dataset, and the second historical authentication dataset. In calculating the second unauthorized access likelihood score, event authentication orchestration computing platform 110 may first analyze the contents of the second historical authentication information. That is, event authentication orchestration computing platform 110 may evaluate the contents of the second historical authentication information to determine a likeliness that client computing device 160 and/or the second alias has been comprised by unauthorized access.

For example, as noted above, the one or more second operation records may store irregular or unusual activities detected in association with client computing device 160 and/or the second alias. Each of the entries in the one or more second operation records may be assigned different weights. Event authentication orchestration computing platform 110 may dynamically determine the weights to be assigned to each of the entries in the one or more second operation records, or these weights may be predetermined. In one scenario, event authentication orchestration computing platform 110 may assign higher weights to entries associated with client computing device 160 and lower weights to entries associated with the second alias. For example, event authentication orchestration computing platform 110 may give higher weight to an entry in the one or more second operation records indicating that a recent payment transaction for an unusually high amount of funds than an entry in the one or more second operation records indicating that the second alias was recently modified. Additionally, each of the entries in the one or more second operation records may have a timestamp, and event authentication orchestration computing platform 110 may gradually decrease the weights of older entries. Event authentication orchestration computing platform 110 may calculate a preliminary unauthorized access likelihood score for client computing device 160 based on the logged entries in the one or more second operation records in the second historical authentication information utilizing the weights assigned to each of the entries.

In calculating the second unauthorized access likelihood score, event authentication orchestration computing platform 110 may further compare contents of the second dynamic authentication dataset and the third dynamic authentication dataset with the contents of the second historical authentication information. In comparing the contents of the second dynamic authentication dataset and the third dynamic authentication dataset with the contents of the second historical authentication information, event authentication orchestration computing platform 110 may determine whether the parameters of the first event (transaction amount, source account/alias information, destination account/alias information, IP address, GPS coordinates) are tracking the parameters of the unusual payment transaction entries in the one or more second operation records stored in the second historical authentication information, or whether the parameters of the first event track the usual payment transaction entries in the transaction history stored in the second historical authentication information. Event authentication orchestration computing platform 110 may then adjust the preliminary unauthorized access likelihood score calculated for client computing device 160 based on a result of the comparison of the contents of the second dynamic authentication dataset and the third dynamic authentication dataset with the contents of the second historical authentication information.

At step 206, event authentication orchestration computing platform 110 may calculate a first event security score. For example, event authentication orchestration computing platform 110 may calculate a first event security score for the first event based on the first unauthorized access likelihood score and the second unauthorized access likelihood score. In calculating the first event security score, event authentication orchestration computing platform 110 may assign a weight to each of the first unauthorized access likelihood score and the second unauthorized access likelihood score. Additionally, in calculating the first event security score, event authentication orchestration computing platform 110 may analyze a transaction history between client computing device 150 and client computing device 160. Event authentication orchestration computing platform 110 may extract the transaction history between client computing device 150 and client computing device 160 from the first historical authentication information and/or the second historical authentication information.

For example, event authentication orchestration computing platform 110 may analyze the first historical authentication information to determine whether any previously authenticated events stored in the transaction history are directed to client computing device 150 initiating payment transactions with client computing device 160 or client computing device 150 receiving payment transactions from client computing device 160. Event authentication orchestration computing platform 110 may then determine, for each of these previously authenticated events between client computing device 150 and client computing device 160, the source of the payment transaction (e.g., the account from which the payment was made or the user alias associated with the account), the destination of the payment transaction (e.g., the account to which the payment was made or the user alias associated with the account), the payment transaction amount, and the IP addresses and/or GPS coordinates of each of client computing device 150 and client computing device 160 during that previously authenticated event.

Event authentication orchestration computing platform 110 may then compare contents of the first event authentication request to the contents of the previously authenticated events between client computing device 150 and client computing device 160. By comparing the contents of the first event authentication request to the contents of the previously authenticated events between client computing device 150 and client computing device 160, event authentication orchestration computing platform 110 may determine whether the parameters of the first event (e.g., source account/alias information, destination account/alias information, IP address and/or GPS coordinates, payment transaction amount) track the parameters of previously authenticated events between client computing device 150 and client computing device 160. Event authentication orchestration computing platform 110 may then calculate the first event security score based on the first unauthorized access likelihood score, the second unauthorized access likelihood score, and the analysis of the transaction history between client computing device 150 and client computing device 160. Event authentication orchestration computing platform 110 may then compare the first event security score to a first predetermined threshold value. If event authentication orchestration computing platform 110 determines that the first event security score is below the first predetermined threshold value, event authentication orchestration computing platform 110 may proceed directly to the series of steps 250, discussed below. If event authentication orchestration computing platform 110 determines that the first event security score is above the first predetermined threshold, event authentication orchestration computing platform 110 may proceed to step 207.

At step 207, event authentication orchestration computing platform 110 may generate one or more first authentication commands. For example, event authentication orchestration computing platform 110 may generate one or more first authentication commands instructing unauthorized access computing device 120 to perform a first unauthorized access analysis on the first event request. As noted above, event authentication orchestration computing platform 110 may be operated by and/or otherwise associated with a particular organization (e.g., a financial institution) and may, in some instances, be configured to authenticate one or more events (e.g., payments transactions, including cross-border payment transactions and/or cross-currency payment transactions). As further noted above, unauthorized access computing device 120 and unauthorized access computing device 125 may each be configured to perform risk analysis on events that are requested by one or more client computing devices.

Event authentication orchestration computing platform 110 may select unauthorized access computing device 120 to perform the risk analysis based on an analysis of one or more of the first event, the first historical authentication information for client computing device 150 (including the one or more first operation records for client computing device 150), the second historical authentication information for client computing device 160 (including the one or more second operation records for client computing device 160), and the transaction history between client computing device 150 and client computing device 160. For example, event authentication orchestration computing platform 110 may determine, from the transaction history between client computing device 150 and client computing device 160, that client computing device 150 regularly sends payments from a first account associated with client computing device 150 to a second account associated with client computing device 160. Event authentication orchestration computing platform 110 may further determine, based on an analysis of the first event, that client computing device 150 is requesting to send a payment from the first account associated with client computing device 150 to a third account associated with client computing device 160. Accordingly, event authentication orchestration computing platform 110 may determine that the first event is to be evaluated using one or more account verification algorithms.

Unauthorized access computing device 120 may have been configured to verify event requests between client computing devices using one or more account verification algorithms. Event authentication orchestration computing platform 110 may then generate one or more first authentication commands instructing unauthorized access computing device 120 to analyze the first event using the one or more account verification algorithms. The first authentication commands may include one or more of the first event, the first historical authentication information for client computing device 150 (including the one or more first operation records for client computing device 150), the second historical authentication information for client computing device 160 (including the one or more second operation records for client computing device 160), and the transaction history between client computing device 150 and client computing device 160.

Figure 2C:
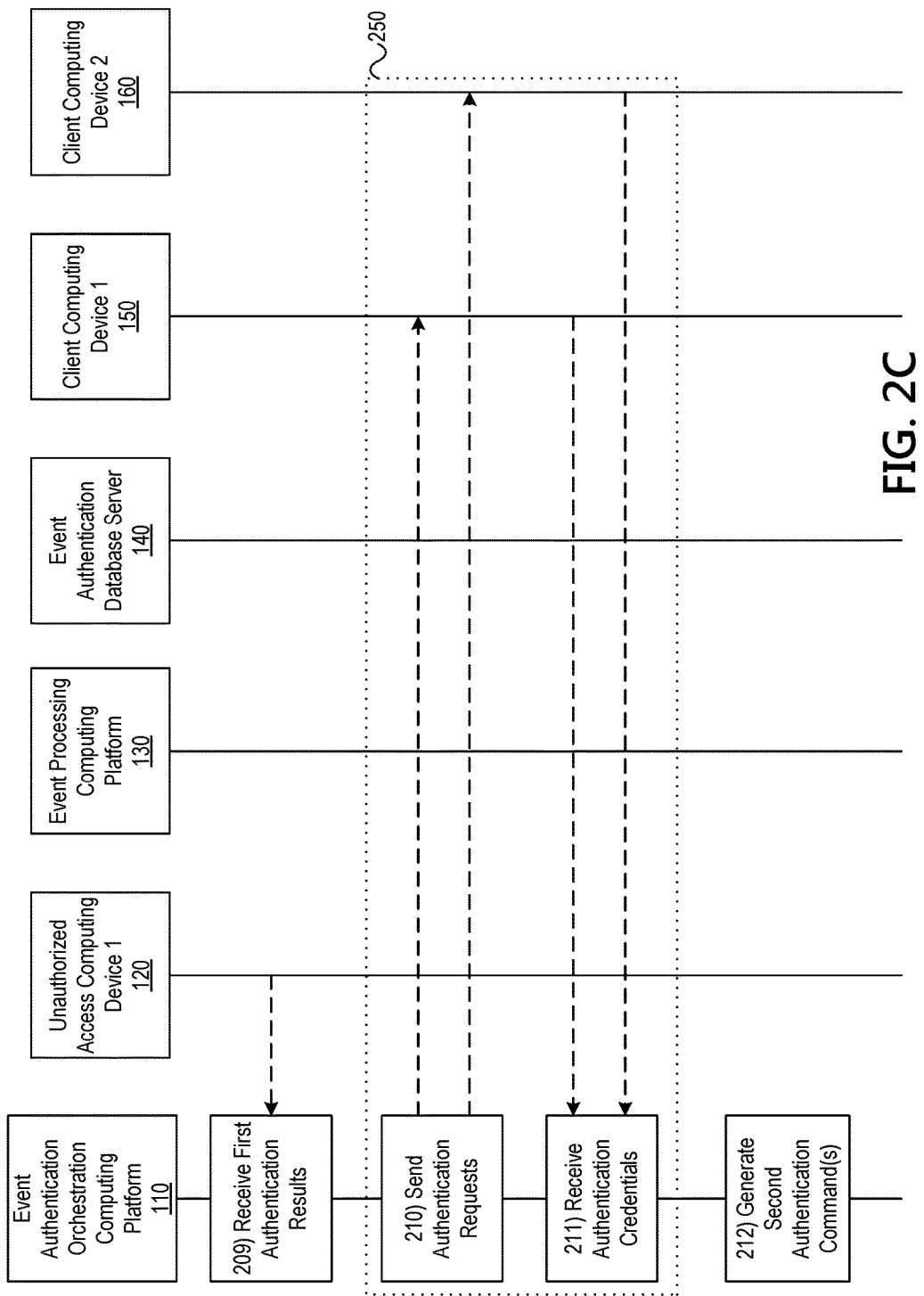

At step 208, event authentication orchestration computing platform 110 may send the one or more first authentication commands. For example, event authentication orchestration computing platform 110 may send the one or more first authentication commands instructing unauthorized access computing device 120 to perform a first unauthorized access analysis on the first event request to unauthorized access computing device 120. Referring to FIG. 2C, at step 209, event authentication orchestration computing platform 110 may receive first authentication results from unauthorized access computing device 120. The first authentication results from unauthorized access computing device 120 may include an indication of whether one or more accounts associated with client computing device 150 and/or client computing device 160 were successfully verified by unauthorized access computing device 120. If the first authentication results received at step 209 indicate that there has been unauthorized access (e.g., there has been unauthorized access to an account associated with client computing device 150 and/or client computing device 160), event authentication orchestration computing platform 110 may proceed directly to step 212, discussed below.

If the first authentication results received at step 209 indicate that there has not been unauthorized access (e.g., there has been no unauthorized access to an account associated with client computing device 150 and/or client computing device 160), event authentication orchestration computing platform 110 may proceed to the series of steps 250. Additionally, as noted above, if event authentication orchestration computing platform 110 determines, at step 206, that the first event security score is below the first predetermined threshold value, event authentication orchestration computing platform 110 may proceed to the series of steps 250.

At step 210 (the first step in the series of steps 250), event authentication orchestration computing platform 110 may send authentication credential requests to client computing device 150 and client computing device 160. For example, event authentication orchestration computing platform 110 may send a first authentication credential request to client computing device 150 and a second authentication credential request to client computing device 160. In one example, the authentication credential requests may be in the form of one or more security questions that were previously answered by users of client computing device 150 and/or client computing device 160. In another example, the authentication credential requests may be requests for a one-time passcode that have been sent to secondary computing devices or user aliases associated with client computing device 150 and client computing device 160. In another example, the authentication credentials requests may be requests for biometric data.

Figure 3:
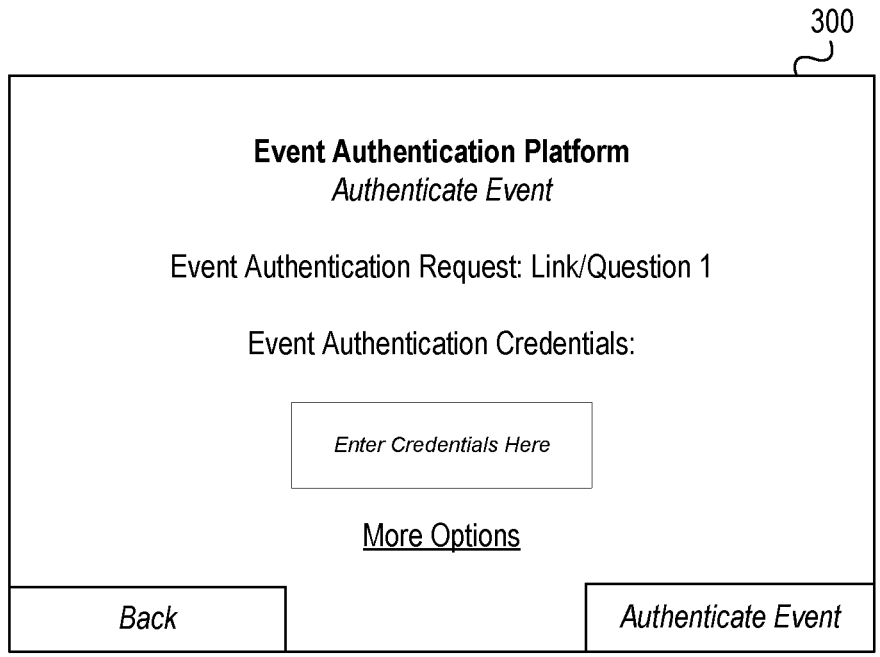
FIGS. 3-6 depict example graphical user interfaces for multicomputer processing of an event authentication request with centralized event orchestration in accordance with one or more example embodiments.

In sending the authentication credential request to client computing device 150, event authentication orchestration computing platform 110 may cause client computing device 150 to display and/or otherwise present a graphical authentication credential request similar to graphical authentication credential request 300, which is illustrated in FIG. 3. As seen in FIG. 3, graphical authentication credential request 300 may include one or more fields, controls, and/or other elements that may allow a user of client computing device 150 to view an authentication credential request and to enter one or more authentication credentials. For example, graphical authentication credential request 300 may include one or more fields, controls, and/or other elements that may display an authentication credential request. Additionally, graphical authentication credential request 300 may include one or more fields, controls, and/or other elements that may be utilized by a user of client computing device 150 to enter in the requested authenticated credentials. Alternatively, graphical authentication credential request 300 may include one or more fields, controls, and/or other elements that may display a hyperlink that, when selected by a user of client computing device 150, may direct the user to a webpage displaying the authentication credential request. The web page may further include one or more fields that may be utilized by a user of client computing device 150 to enter in the requested authenticated credentials.

Figure 4:
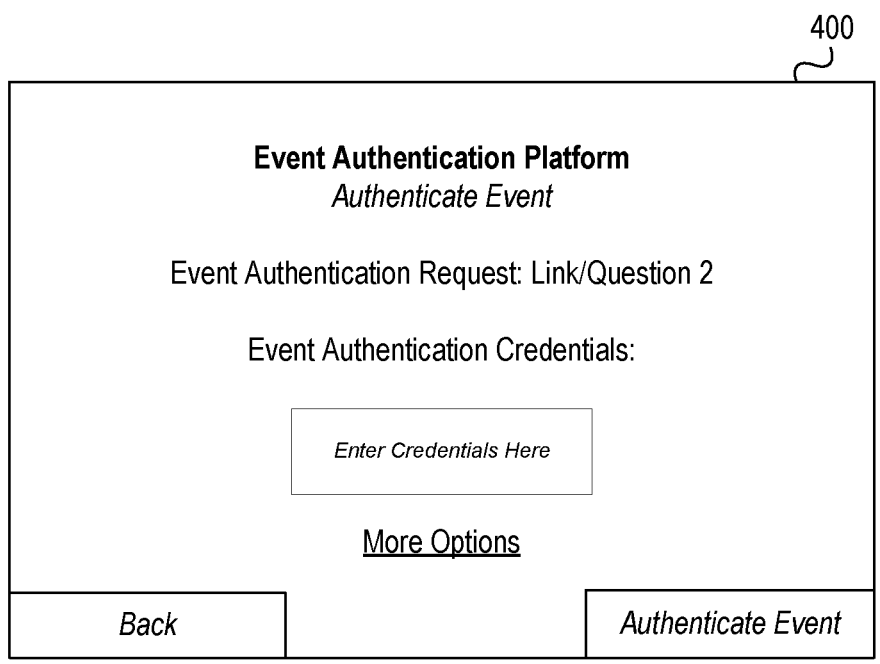

In sending the authentication credential request to client computing device 160, event authentication orchestration computing platform 110 may cause client computing device 160 to display and/or otherwise present a graphical authentication credential request similar to graphical authentication credential request 400, which is illustrated in FIG. 4. As seen in FIG. 4, graphical authentication credential request 400 may include one or more fields, controls, and/or other elements that may allow a user of client computing device 160 to view an authentication credential request and to enter one or more authentication credentials. For example, graphical authentication credential request 400 may include one or more fields, controls, and/or other elements that may display an authentication credential request. Additionally, graphical authentication credential request 400 may include one or more fields, controls, and/or other elements that may be utilized by a user of client computing device 160 to enter in the requested authenticated credentials. Alternatively, graphical authentication credential request 400 may include one or more fields, controls, and/or other elements that may display a hyperlink that, when selected by a user of client computing device 160, may direct the user to a webpage displaying the authentication credential request. The web page may further include one or more fields that may be utilized by a user of client computing device 160 to enter in the requested authenticated credentials.

Referring back to FIG. 2C, at step 211 (the last step in the series of steps 250), event authentication orchestration computing platform 110 may receive authentication credentials from client computing device 150 and client computing device 160. For example, event authentication orchestration computing platform 110 may receive first authentication credentials from client computing device 150 and second authentication credentials from client computing device 160. Event authentication orchestration computing platform 110 may receive the first authentication credentials from client computing device 150 via graphical authentication credential request 300. Event authentication orchestration computing platform 110 may receive the second authentication credentials from client computing device 160 via graphical authentication credential request 400. Event authentication orchestration computing platform 110 may validate the credential data with authentication data stored at event authentication database server 140 or event authentication orchestration computing platform 110.

For example, if the authentication credential requests were in the form of one or more security questions that were previously answered by users of client computing device 150 and client computing device 160, event authentication orchestration computing platform 110 may retrieve the answers previously provided and compare the previously provided answers with the authentication credentials received from client computing device 150 and client computing device 160. If the authentication credential requests were requests for a one-time passcode, event authentication orchestration computing platform 110 may retrieve the one-time passcodes that were sent to client computing device 150 and client computing device 160 and compare the transmitted one-time passcodes to the authentication credentials received from client computing device 150 and client computing device 160. If the authentication credentials request were requests for biometric data, event authentication orchestration computing platform 110 may retrieve previously stored biometric data associated with client computing device 150 and client computing device 160 and compare the previously stored biometric data to the biometric data received from client computing device 150 and client computing device 160.

At step 212, event authentication orchestration computing platform 110 may generate one or more second authentication commands. If the first authentication results received at step 209 indicate that there has been unauthorized access (e.g., there has been unauthorized access to an account associated with client computing device 150 and/or client computing device 160), event authentication orchestration computing platform 110 may generate one or more second authentication commands directed to instructing event processing computing platform 130 to deny the first event. If the authentication credentials received at step 211 for both client computing device 150 and client computing device 160 match the authentication data stored in event authentication database server 140 and/or event authentication orchestration computing platform 110, event authentication orchestration computing platform 110 may generate one or more second authentication commands directed to instructing event processing computing platform 130 to process the first event. For example, if the one-time passcode send to client computing device 150 matches the one-time passcode received from client computing device 150, and the one-time passcode send to client computing device 160 matches the one-time passcode received from client computing device 160, event authentication orchestration computing platform 110 may generate one or more second authentication commands directed to instructing event processing computing platform 130 to process the first event. If the authentication credentials received at step 211 for one or more of client computing device 150 and client computing device 160 do not match the authentication data stored in event authentication database server 140 and/or event authentication orchestration computing platform 110, event authentication orchestration computing platform 110 may generate one or more second authentication commands directed to instructing event processing computing platform 130 to deny the first event.

Referring to FIG. 2D, at step 213, event authentication orchestration computing platform 110 may send the one or more second authentication commands to event processing computing platform 130. In a first example, event authentication orchestration computing platform 110 may send one or more second authentication commands to event processing computing platform 130, the second authentication commands directed to instructing event processing computing platform 130 to process the first event request. In a second example, event authentication orchestration computing platform 110 may send one or more second event authentication commands to event processing computing platform 130, the second commands directed to instructing event processing computing platform 130 to deny the first event request.

At step 214, event authentication orchestration computing platform 110 may receive a second event authentication request from event processing computing platform 130. For example, event authentication orchestration computing platform 110 may receive a second event authentication request to authenticate a second event between client computing device 170 and client computing device 180. Event authentication orchestration computing platform 110 may be operated by and/or otherwise associated with a particular organization (e.g., a financial institution) and may, in some instances, be configured to authenticate one or more events (e.g., payments transactions, including cross-border payment transactions and/or cross-currency payment transactions) between client devices, such as client computing device 170 and client computing device 180. In one scenario, the second event may be a payment transaction between client computing device 170 and client computing device 180, wherein client computing device 170 has requested to make a payment to client computing device 180.

At step 215, event authentication orchestration computing platform 110 may generate a third authentication dataset based on contents of the second event authentication request received from event processing computing platform 130. For example, event authentication orchestration computing platform 110 may generate a fourth dynamic authentication dataset for client computing device 170, a fifth dynamic authentication dataset for client computing device 180, and a sixth dynamic authentication dataset for the second event, based on contents of the second event authentication request received from event processing computing platform 130. The second event authentication request received from event processing computing platform 130 may include multiple sets of data.

The second event authentication request received from event processing computing platform 130 may include a first dataset storing information associated with client computing device 170. As noted above, client computing device 170 may be associated with a third alias, and information identifying the third alias may be stored in the first dataset. Event authentication orchestration computing platform 110 may extract this information from the first dataset and store it in the fourth dynamic authentication dataset. Additionally, the Internet Protocol (IP) address and/or GPS coordinates of client computing device 170 may be stored in the first dataset. Event authentication orchestration computing platform 110 may store the IP address and/or GPS coordinates of client computing device 170 in the fourth dynamic authentication dataset. In other embodiments, the make and/or model information for client computing device 170 may additionally or alternatively be extracted from the first dataset of the second event authentication request and stored in the fourth dynamic authentication dataset.

The second event authentication request received from event processing computing platform 130 may additionally include a second dataset storing information associated with client computing device 180. As noted above, client computing device 180 may be associated with a fourth alias, and information identifying the fourth alias may be stored in the second dataset. Event authentication orchestration computing platform 110 may extract this information from the second dataset and store it in the fifth dynamic authentication dataset. Additionally, the IP address and/or GPS coordinates of client computing device 180 may be stored in the second dataset. Event authentication orchestration computing platform 110 may store the IP address and/or GPS coordinates of client computing device 180 in the fifth dynamic authentication dataset. In other embodiments, the make and/or model information for client computing device 180 may additionally or alternatively be extracted from the second dataset of the second event authentication request and stored in the fifth dynamic authentication dataset.

The second event authentication request received from event processing computing platform 130 may include a third dataset storing information related to the second event. The third dataset may include information identifying the date of the second event (e.g., the date the payment transaction between client computing device 170 and client computing device 180 was initiated), information identifying the source of the payment (for example, one or more accounts associated with the third alias and/or client computing device 170 or one or more aliases associated with client computing device 170), information identifying the destination of the payment (for example, one or more accounts associated with client computing device 180 or one or more aliases associated with client computing device 180), and other relevant information (for example, the amount of the payment transaction). Event authentication orchestration computing platform 110 may extract this information from the third dataset and store it in the sixth dynamic authentication dataset.

At step 216, event authentication orchestration computing platform 110 may receive a fourth authentication dataset from event authentication database server 140. For example, event authentication orchestration computing platform 110 may receive a fourth authentication dataset comprising third historical authentication information for client computing device 170 and fourth historical authentication information for client computing device 180. Event authentication database server 140 may store historical information for one or more client computing devices. The third historical authentication information for client computing device 170 may include multiple datasets associated with client computing device 170 and/or the third alias associated with client computing device 170. For example, the third historical authentication information may store a transaction history for client computing device 170 and the third alias.

The transaction history may include a list of all previously authenticated events associated with client computing device 170 and/or the third alias. The previously authenticated events associated with client computing device 170 and/or the third alias may include any payment transactions initiated by client computing device 170 (and/or the third alias) and/or any payment transactions received by client computing device 170 (and/or the third alias) that were processed by event authentication orchestration computing platform 110. The previously authenticated events associated with client computing device 170 and/or the third alias may include events that were denied by event authentication orchestration computing platform 110 and/or events that were approved by event authentication orchestration computing platform 110.

The transaction history for client computing device 170 may include, for each previously authenticated event associated with client computing device 170 and/or the third alias, an indication of whether event authentication orchestration computing platform 110 denied or approved that previously authenticated event. The transaction history for each previously authenticated event for which client computing device 170 was the originating device may include a transaction amount of that previously authenticated event, a source for that previously authenticated event (e.g., the account from which the payment was made and/or the user alias associated with the account), the destination for that previously authenticated event (e.g., a recipient client device, an alias associated with the recipient client device, the IP address and/or GPS coordinates of the recipient client device, and/or an account to which the payment was made), and the IP address and/or GPS coordinates of client computing device 170 at the time of that previously authenticated event. The transaction history for each previously authenticated event for which client computing device 170 was the recipient device may include a transaction amount of that previously authenticated event, a source for that previously authenticated event (e.g., an originating client device, the IP address and/or GPS coordinates of the originating client device, an alias associated with the originating client device, and/or an account from which the payment was made), the destination for that previously authenticated event (e.g., the account to which the payment was made and/or an alias associated with the account), and the IP address and/or GPS coordinates of client computing device 170 at the time of that previously authenticated event.

The third historical authentication information may further store one or more third operation records for client computing device 170 and the third alias. The one or more third operation records may log irregular operations related to client computing device 170 and/or the third alias. As noted above, client computing device 170 may be associated with a third alias. The third alias may be an email address, a mobile telephone number, a social networking handle, and/or the like. For example, if a user of client computing device 170 modifies the third alias (for example, by modifying the email address), this operation may be logged within the historical information for client computing device 170 in event authentication database server 140 by event processing computing platform 130. In another example, if a user of client computing device 170 associates client computing device 170 with a new user alias, this operation may be logged within the historical information for client computing device 170 in event authentication database server 140 by event processing computing platform 130 or event authentication orchestration computing platform 110.

Irregular operations within the transaction history for client computing device 170 may also be stored in the one or more third operation records for client computing device 170. For example, as stated above, the transaction history for client computing device 170 may include, for each previously authenticated event, a payment transaction amount, a source account (or alias associated with the source account), a destination account (or alias associated with the destination account), and IP addresses and/or GPS coordinates of the originating and recipient devices. Event authentication orchestration computing platform 110 may recurrently analyze the transaction history for client computing device 170 and store irregular operations in the one or more third operation records for client computing device 170. For example, if client computing device 170 initiated a payment transaction for a payment amount that was substantially greater than previous payment amounts for client computing device 170, event authentication orchestration computing platform 110 may store the payment transaction and associated data in the one or more third operation records for client computing device 170. In another example, if the source account (or associated alias) for a payment transaction originating from client computing device 170 had not previously been a source for payment transaction events originating from client computing device 170, event authentication orchestration computing platform 110 may log the payment transaction and associated data in the one or more third operation records for client computing device 170. In a different example, if the destination account (or associated alias) for a payment transaction received by client computing device 170 had not previously been a destination for payment transaction events received by client computing device 170, event authentication orchestration computing platform 110 may log the payment transaction and associated data in the one or more third operation records for client computing device 170. In another example, if the IP address of client computing device 170 while client computing device 170 is requesting to make or receive a payment transaction is different than a usual IP address utilized by client computing device 170, event authentication orchestration computing platform 110 may log the payment transaction and associated data in the one or more third operation records for client computing device 170.

The fourth historical authentication information for client computing device 180 may include multiple datasets associated with client computing device 180 and/or the fourth alias associated with client computing device 180. For example, the fourth historical authentication information may store a transaction history for client computing device 180 and the fourth alias. The transaction history may include a list of all previously authenticated events associated with client computing device 180 and/or the fourth alias. The previously authenticated events associated with client computing device 180 and/or the fourth alias may include any payment transactions initiated by client computing device 180 (and/or the fourth alias) and/or any payment transactions received by client computing device 180 (and/or the fourth alias) that were processed by event authentication orchestration computing platform 110. The previously authenticated events associated with client computing device 180 and/or the fourth alias may include events that were denied by event authentication orchestration computing platform 110 and/or events that were approved by event authentication orchestration computing platform 110.

The transaction history for client computing device 180 may include, for each previously authenticated event associated with client computing device 180 and/or the fourth alias, an indication of whether event authentication orchestration computing platform 110 denied or approved that previously authenticated event. The transaction history for each previously authenticated event for which client computing device 180 was the originating device may include a transaction amount of that previously authenticated event, a source for that previously authenticated event (e.g., the account from which the payment was made and/or the user alias associated with the account), the destination for that previously authenticated event (e.g., a recipient client device, an alias associated with the recipient client device, the IP address and/or GPS coordinates of the recipient client device, and/or an account to which the payment was made), and the IP address and/or GPS coordinates of client computing device 180 at the time of that previously authenticated event. The transaction history for each previously authenticated event for which client computing device 180 was the recipient device may include a transaction amount of that previously authenticated event, a source for that previously authenticated event (e.g., an originating client device, the IP address and/or GPS coordinates of the originating client device, an alias associated with the originating client device, and/or an account from which the payment was made), the destination for that previously authenticated event (e.g., the account to which the payment was made and/or an alias associated with the account), and the IP address and/or GPS coordinates of client computing device 180 at the time of that previously authenticated event.

The fourth historical authentication information may further store one or more fourth operation records for client computing device 180 and the fourth alias. The one or more fourth operation records may log irregular operations related to client computing device 180 and/or the fourth alias. As noted above, client computing device 180 may be associated with a fourth alias. The fourth alias may be an email address, a mobile telephone number, a social networking handle, and/or the like. For example, if a user of client computing device 180 modifies the fourth alias (for example, by modifying the email address), this operation may be logged within the historical information for client computing device 180 in event authentication database server 140 by event processing computing platform 130. In another example, if a user of client computing device 180 associates client computing device 180 with a new user alias, this operation may be logged within the historical information for client computing device 180 in event authentication database server 140 by event processing computing platform 130 or event authentication orchestration computing platform 110.

Irregular operations within the transaction history for client computing device 180 may also be stored in the one or more fourth operation records for client computing device 180. For example, as stated above, the transaction history for client computing device 180 may include, for each previously authenticated event, a payment transaction amount, a source account (or alias associated with the source account), a destination account (or alias associated with the destination account), and IP addresses and/or GPS coordinates of the originating and recipient devices. Event authentication orchestration computing platform 110 may recurrently analyze the transaction history for client computing device 180 and store irregular operations in the one or more fourth operation records for client computing device 180. For example, if client computing device 180 initiated a payment transaction for a payment amount that was substantially greater than previous payment amounts for client computing device 180, event authentication orchestration computing platform 110 may store the payment transaction and associated data in the one or more fourth operation records for client computing device 180. In another example, if the source account (or associated alias) for a payment transaction originating from client computing device 180 had not previously been a source for payment transaction events originating from client computing device 180, event authentication orchestration computing platform 110 may log the payment transaction and associated data in the one or more fourth operation records for client computing device 180. In a different example, if the destination account (or associated alias) for a payment transaction received by client computing device 180 had not previously been a destination for payment transaction events received by client computing device 180, event authentication orchestration computing platform 110 may log the payment transaction and associated data in the one or more fourth operation records for client computing device 180. In another example, if the IP address of client computing device 180 while client computing device 180 is requesting to make or receive a payment transaction is different than a usual IP address utilized by client computing device 180, event authentication orchestration computing platform 110 may log the payment transaction and associated data in the one or more fourth operation records for client computing device 180.

Referring to FIG. 2E, at step 217, event authentication orchestration computing platform 110 may calculate a third unauthorized access likelihood score. For example, event authentication orchestration computing platform 110 may calculate a third unauthorized access likelihood score for client computing device 170 based on the fourth dynamic authentication dataset, the sixth dynamic authentication dataset, and the third historical authentication dataset. In calculating the third unauthorized access likelihood score, event authentication orchestration computing platform 110 may first analyze the contents of the third historical authentication information. That is, event authentication orchestration computing platform 110 may evaluate the contents of the third historical authentication information to determine a likelihood that client computing device 170 and/or the third alias has been comprised by unauthorized access. For example, as noted above, the one or more third operation records stored in the third historical authentication information may store irregular or unusual activities detected in association with client computing device 170 and/or the third alias. Each of the entries in the one or more third operation records may be assigned different weights. Event authentication orchestration computing platform 110 may dynamically determine the weights to be assigned to each of the entries in the one or more third operation records, or these weights may be predetermined. In one scenario, event authentication orchestration computing platform 110 may assign higher weights to entries associated with client computing device 170 and lower weights to entries associated with the third alias. For example, event authentication orchestration computing platform 110 may give higher weight to an entry in the one or more third operation records indicating that a recent payment transaction for an unusually high amount of funds than an entry in the one or more third operation records indicating that the third alias was recently modified. Additionally, each of the entries in the one or more third operation records may have a timestamp, and event authentication orchestration computing platform 110 may gradually decrease the weights of older entries. Event authentication orchestration computing platform 110 may calculate a preliminary unauthorized access likelihood score for client computing device 170 based on the logged entries in the one or more third operation records in the third historical authentication information utilizing the weights assigned to each of the entries.

In calculating the third unauthorized access likelihood score, event authentication orchestration computing platform 110 may further compare contents of the fourth dynamic authentication dataset and the sixth dynamic authentication dataset with the contents of the third historical authentication information. In comparing the contents of the fourth dynamic authentication dataset and the sixth dynamic authentication dataset with the contents of the third historical authentication information, event authentication orchestration computing platform 110 may determine whether the parameters of the second event (transaction amount, source account/alias information, destination account/alias information, IP address, GPS coordinates) are tracking the parameters of the unusual payment transaction entries in the one or more third operation records stored in the third historical authentication information, or whether the parameters of the second event track the usual payment transaction entries in the transaction history stored in the third historical authentication information. Event authentication orchestration computing platform 110 may then adjust the preliminary unauthorized access likelihood score calculated for client computing device 170 based on a result of the comparison of the contents of the fourth dynamic authentication dataset and the sixth dynamic authentication dataset with the contents of the third historical authentication information.

At step 218, event authentication orchestration computing platform 110 may calculate a fourth unauthorized access likelihood score. For example, event authentication orchestration computing platform 110 may calculate a fourth unauthorized access likelihood score for client computing device 180 based on the fifth dynamic authentication dataset, the sixth dynamic authentication dataset, and the fourth historical authentication dataset. In calculating the fourth unauthorized access likelihood score, event authentication orchestration computing platform 110 may first analyze the contents of the fourth historical authentication information. That is, event authentication orchestration computing platform 110 may evaluate the contents of the fourth historical authentication information to determine a likelihood that client computing device 180 and/or the fourth alias has been comprised by unauthorized access. For example, as noted above, the one or more fourth operation records may store irregular or unusual activities detected in association with client computing device 180 and/or the fourth alias. Each of the entries in the one or more fourth operation records may be assigned different weights. Event authentication orchestration computing platform 110 may dynamically determine the weights to be assigned to each of the entries in the one or more fourth operation records, or these weights may be predetermined. In one scenario, event authentication orchestration computing platform 110 may assign higher weights to entries associated with client computing device 180 and lower weights to entries associated with the fourth alias. For example, event authentication orchestration computing platform 110 may give higher weight to an entry in the one or more fourth operation records indicating that a recent payment transaction for an unusually high amount of funds than an entry in the one or more fourth operation records indicating that the fourth alias was recently modified. Additionally, each of the entries in the one or more fourth operation records may have a timestamp, and event authentication orchestration computing platform 110 may gradually decrease the weights of older entries. Event authentication orchestration computing platform 110 may calculate a preliminary unauthorized access likelihood score for client computing device 180 based on the logged entries in the one or more fourth operation records in the fourth historical authentication information utilizing the weights assigned to each of the entries.

In calculating the fourth unauthorized access likelihood score, event authentication orchestration computing platform 110 may further compare contents of the fifth dynamic authentication dataset and the sixth dynamic authentication dataset with the contents of the fourth historical authentication information. In comparing the contents of the fifth dynamic authentication dataset and the sixth dynamic authentication dataset with the contents of the fourth historical authentication information, event authentication orchestration computing platform 110 may determine whether the parameters of the second event (transaction amount, source account/alias information, destination account/alias information, IP address, GPS coordinates) are tracking the parameters of the unusual payment transaction entries in the one or more fourth operation records stored in the fourth historical authentication information, or whether the parameters of the second event track the usual payment transaction entries in the transaction history stored in the fourth historical authentication information. Event authentication orchestration computing platform 110 may then adjust the preliminary unauthorized access likelihood score calculated for client computing device 180 based on a result of the comparison of the fifth dynamic authentication dataset and the sixth dynamic authentication dataset with the contents of the fourth historical authentication information.

At step 219, event authentication orchestration computing platform 110 may calculate a second event security score. For example, event authentication orchestration computing platform 110 may calculate a second event security score for the second event based on the third unauthorized access likelihood score and the fourth unauthorized access likelihood score. In calculating the second event security score, event authentication orchestration computing platform 110 may assign a weight to each of the third unauthorized access likelihood score and the fourth unauthorized access likelihood score. Additionally, in calculating the second event security score, event authentication orchestration computing platform 110 may analyze a transaction history between client computing device 170 and client computing device 180. Event authentication orchestration computing platform 110 may extract the transaction history between client computing device 170 and client computing device 180 from the third historical authentication information and/or the fourth historical authentication information. For example, event authentication orchestration computing platform 110 may analyze the third historical authentication information to determine whether any previously authenticated events are directed to client computing device 170 initiating a payment transactions with client computing device 180 or client computing device 170 receiving payment transactions from client computing device 180. Event authentication orchestration computing platform 110 may then determine, for each of these previously authenticated events between client computing device 170 and client computing device 180, the source of the payment transaction (e.g., the account from which the payment was made or the user alias associated with the account), the destination of the payment transaction (e.g., the account to which the payment was made or the user alias associated with the account), the payment transaction amount, and the IP addresses and/or GPS coordinates of each of client computing device 170 and client computing device 180 during that previously authenticated event. Event authentication orchestration computing platform 110 may then compare contents of the second event authentication request to the contents of the previously authenticated events between client computing device 170 and client computing device 180. By comparing the contents of the second event authentication request to the contents of the previously authenticated events between client computing device 170 and client computing device 180, event authentication orchestration computing platform 110 may determine whether the parameters of the second event (e.g., source account/alias information, destination account/alias information, IP address and/or GPS coordinates, payment transaction amount) track the parameters of previously authenticated events between client computing device 170 and client computing device 180.

Event authentication orchestration computing platform 110 may then calculate the second event security score based on the third unauthorized access likelihood score, the fourth unauthorized access likelihood score, and the analysis of the transaction history between client computing device 170 and client computing device 180. Event authentication orchestration computing platform 110 may then compare the second event security score to a second predetermined threshold value. If event authentication orchestration computing platform 110 determines that the second event security score is below the second predetermined threshold value, event authentication orchestration computing platform 110 may proceed directly to the series of steps 260, discussed below. If event authentication orchestration computing platform 110 determines that the second event security score is above the second predetermined threshold, event authentication orchestration computing platform 110 may proceed to step 220.

At step 220, event authentication orchestration computing platform 110 may generate one or more third authentication commands. For example, event authentication orchestration computing platform 110 may generate one or more third authentication commands instructing unauthorized access computing device 125 to perform a second unauthorized access analysis on the second event request. As noted above, event authentication orchestration computing platform 110 may be operated by and/or otherwise associated with a particular organization (e.g., a financial institution) and may, in some instances, be configured to authenticate one or more events (e.g., payments transactions, including cross-border payment transactions and/or cross-currency payment transactions). As further noted above, unauthorized access computing device 120 and unauthorized access computing device 125 may each be configured to perform risk analysis on events that are requested by one or more client computing devices.

Event authentication orchestration computing platform 110 may select unauthorized access computing device 125 to perform the risk analysis based on an analysis of one or more of the second event, the third historical authentication information for client computing device 170 (including the one or more third operation records for client computing device 170), the fourth historical authentication information for client computing device 180 (including the one or more fourth operation records for client computing device 180), and the transaction history between client computing device 170 and client computing device 180. For example, event authentication orchestration computing platform 110 may determine, from the IP addresses stored in the third historical authentication information, that client computing device 170 regularly initiates payment transactions from a first geographical region. Event authentication orchestration computing platform 110 may further determine, based on the sixth dynamic authentication dataset for the second event, that client computing device 170 has initiated the payment transaction to client computing device 180 from an IP address corresponding to a different geographic region. Accordingly, event authentication orchestration computing platform 110 may determine that the second event is to be evaluated using one or more identity verification algorithms. Unauthorized access computing device 125 may have been configured to verify event requests between client computing devices using one or more identity verification algorithms.

Event authentication orchestration computing platform 110 may then generate one or more third authentication commands instructing unauthorized access computing device 125 to analyze the second event using the one or more identity verification algorithms. The third authentication commands may include one or more of the second event, the third historical authentication information for client computing device 170 (including the one or more third operation records for client computing device 170), the fourth historical authentication information for client computing device 180 (including the one or more fourth operation records for client computing device 180), and the transaction history between client computing device 170 and client computing device 180.

Referring to FIG. 2F, at step 221, event authentication orchestration computing platform 110 may send one or more third authentication commands to unauthorized access computing device 125. For example, event authentication orchestration computing platform 110 may send one or more third authentication commands instructing unauthorized access computing device 125 to perform a second unauthorized access analysis on the second event request to unauthorized access computing device 125. At step 222, event authentication orchestration computing platform 110 may receive second authentication results from unauthorized access computing device 125.

The second authentication results from unauthorized access computing device 125 may include an indication of whether one or more identities (e.g., users and/or user aliases) associated with client computing device 170 and/or client computing device 180 were successfully verified by unauthorized access computing device 125. If the second authentication results received at step 222 indicate that there has been unauthorized access associated with the users (or user aliases) of client computing device 170 and/or client computing device 180, event authentication orchestration computing platform 110 may proceed directly to step 225. If the second authentication results received at step 222 indicate that there has been no unauthorized access associated with the users (or user aliases) of client computing device 170 and/or client computing device 180, event authentication orchestration computing platform 110 may proceed to the series of steps 260. Additionally, as noted above, if event authentication orchestration computing platform 110 determines, at step 219, that the second event security score is below the second predetermined threshold, event authentication orchestration computing platform 110 may proceed to the series of steps 260.

At step 223 (the first step of series of steps 260), event authentication orchestration computing platform 110 may send authentication credential requests to client computing device 170 and client computing device 180. For example, event authentication orchestration computing platform 110 may send a third authentication credential request to client computing device 170 and a fourth authentication credential request to client computing device 180. In one example, the authentication credential requests may be in the form of one or more security questions that were previously answered by users of client computing device 170 and client computing device 180. In another example, the authentication credential requests may be requests for a one-time passcode that have been sent to secondary computing devices or user aliases associated with client computing device 170 and client computing device 180. In another example, the authentication credential requests may be requests for biometric information.

Figure 5:
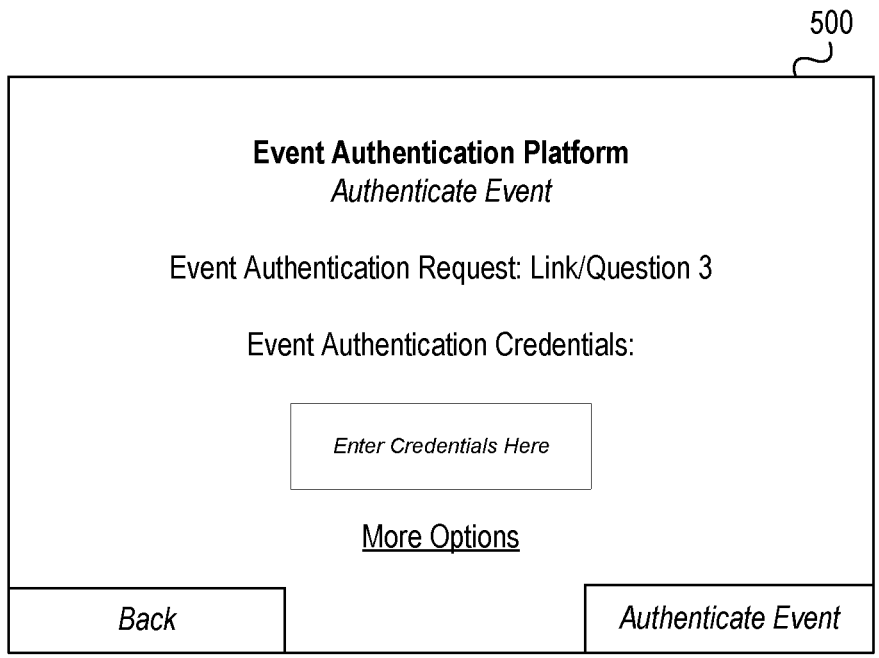

In sending the authentication credential request to client computing device 170, event authentication orchestration computing platform 110 may cause client computing device 170 to display and/or otherwise present a graphical authentication credential request similar to graphical authentication credential request 500, which is illustrated in FIG. 5. As seen in FIG. 5, graphical authentication credential request 500 may include one or more fields, controls, and/or other elements that may allow a user of client computing device 170 to view an authentication credential request and to enter one or more authentication credentials. For example, graphical authentication credential request 500 may include one or more fields, controls, and/or other elements that may display an authentication credential request. Additionally, graphical authentication credential request 500 may include one or more fields, controls, and/or other elements that may be utilized by a user of client computing device 170 to enter in the requested authenticated credentials. Alternatively, graphical authentication credential request 500 may include one or more fields, controls, and/or other elements that may display a hyperlink that, when selected by a user of client computing device 170, may direct the user to a webpage displaying the authentication credential request. The web page may further include one or more fields that may be utilized by a user of client computing device 170 to enter in the requested authenticated credentials.

Figure 6:
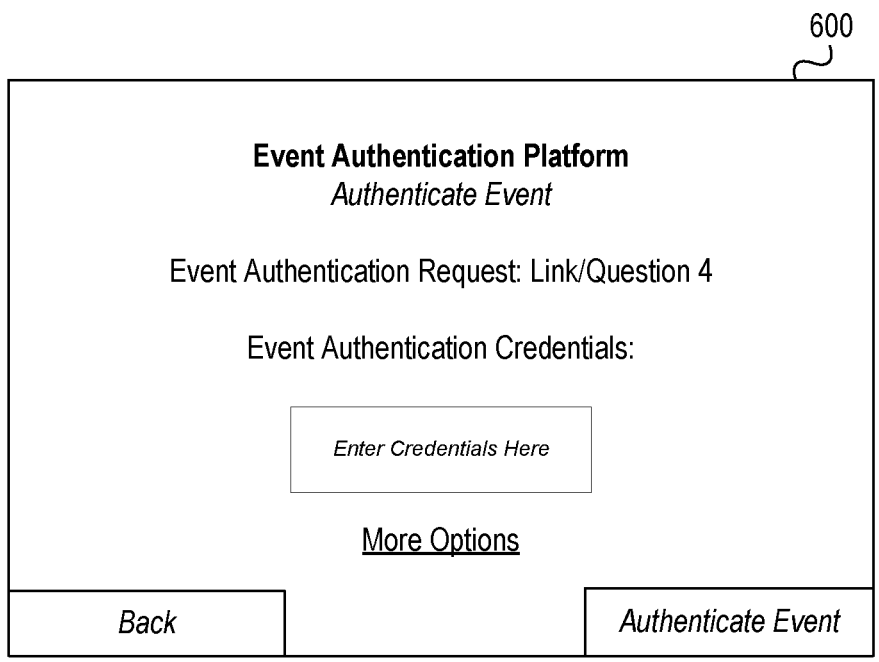

In sending the authentication credential request to client computing device 180, event authentication orchestration computing platform 110 may cause client computing device 180 to display and/or otherwise present a graphical authentication credential request similar to graphical authentication credential request 600, which is illustrated in FIG. 6. As seen in FIG. 6, graphical authentication credential request 600 may include one or more fields, controls, and/or other elements that may allow a user of client computing device 180 to view an authentication credential request and to enter one or more authentication credentials. For example, graphical authentication credential request 600 may include one or more fields, controls, and/or other elements that may display an authentication credential request. Additionally, graphical authentication credential request 600 may include one or more fields, controls, and/or other elements that may be utilized by a user of client computing device 180 to enter in the requested authenticated credentials. Alternatively, graphical authentication credential request 600 may include one or more fields, controls, and/or other elements that may display a hyperlink that, when selected by a user of client computing device 180, may direct the user to a webpage displaying the authentication credential request. The web page may further include one or more fields that may be utilized by a user of client computing device 180 to enter in the requested authenticated credentials.

Referring back to FIG. 2F, at step 224 (the last step of series of steps 260), event authentication orchestration computing platform 110 may receive authentication credentials from client computing device 170 and client computing device 180. For example, event authentication orchestration computing platform 110 may receive third authentication credentials from client computing device 170 and fourth authentication credentials from client computing device 180. Event authentication orchestration computing platform 110 may receive the third authentication credentials from client computing device 170 via graphical authentication credential request 500. Event authentication orchestration computing platform 110 may receive the fourth authentication credentials from client computing device 180 via graphical authentication credential request 600. Event authentication orchestration computing platform 110 may validate the credential data with authentication data stored at event authentication database server 140 or event authentication orchestration computing platform 110.

For example, if the authentication credential requests were in the form of one or more security questions that were previously answered by users of client computing device 170 and client computing device 180, event authentication orchestration computing platform 110 may retrieve the answers previously provided and compare the previously provided answers with the authentication credentials received from client computing device 170 and client computing device 180. If the authentication credential requests were requests for a one-time passcode, event authentication orchestration computing platform 110 may retrieve the one-time passcodes that were sent to client computing device 170 and client computing device 180 and compare the transmitted one-time passcodes to the authentication credentials received from client computing device 170 and client computing device 180. If the authentication credentials request were requests for biometric data, event authentication orchestration computing platform 110 may retrieve previously stored biometric data associated with client computing device 170 and client computing device 180 and compare the previously stored biometric data to the biometric data received from client computing device 170 and client computing device 180.

Figure 2G:
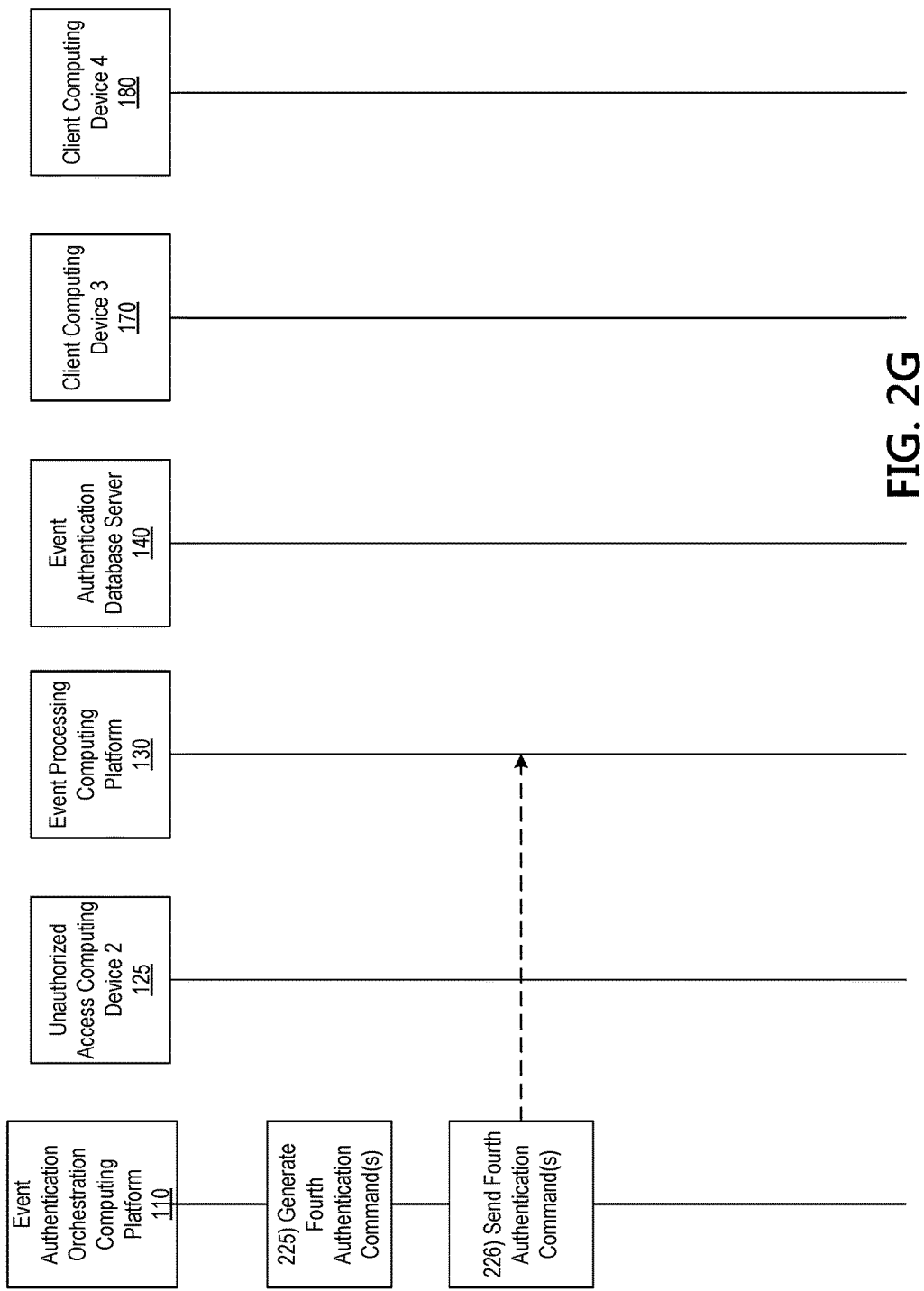

Referring to FIG. 2G, at step 225, event authentication orchestration computing platform 110 may generate one or more fourth authentication commands. If the second authentication results received at step 222 indicate that there has been unauthorized access associated with the users (or user aliases) of client computing device 170 and/or client computing device 180, event authentication orchestration computing platform 110 may generate one or more fourth authentication commands directed to instructing event processing computing platform 130 to deny the second event. If the authentication credentials received at step 224 for both client computing device 170 and client computing device 180 match the authentication data stored in event authentication database server 140 and/or event authentication orchestration computing platform 110, event authentication orchestration computing platform 110 may generate one or more fourth authentication commands directed to instructing event processing computing platform 130 to process the second event. For example, if the one-time passcode send to client computing device 170 matches the one-time passcode received from client computing device 170, and the one-time passcode send to client computing device 180 matches the one-time passcode received from client computing device 180, event authentication orchestration computing platform 110 may generate one or more fourth authentication commands directed to instructing event processing computing platform 130 to process the second event. If the authentication credentials received at step 224 for one or more of client computing device 170 and client computing device 180 do not match the authentication data stored in event authentication database server 140 and/or event authentication orchestration computing platform 110, event authentication orchestration computing platform 110 may generate one or more fourth authentication commands directed to instructing event processing computing platform 130 to deny the second event.

At step 226, event authentication orchestration computing platform 110 may send the one or more fourth authentication commands to event processing computing platform 130. In a first example, event authentication orchestration computing platform 110 may send one or more fourth authentication commands to event processing computing platform 130, the fourth authentication commands directed to instructing event processing computing platform 130 to process the second event. In a second example, event authentication orchestration computing platform 110 may send one or more fourth event authentication commands to event processing computing platform 130, the fourth authentication commands directed to instructing event processing computing platform 130 to deny the second event.

Figure 7:
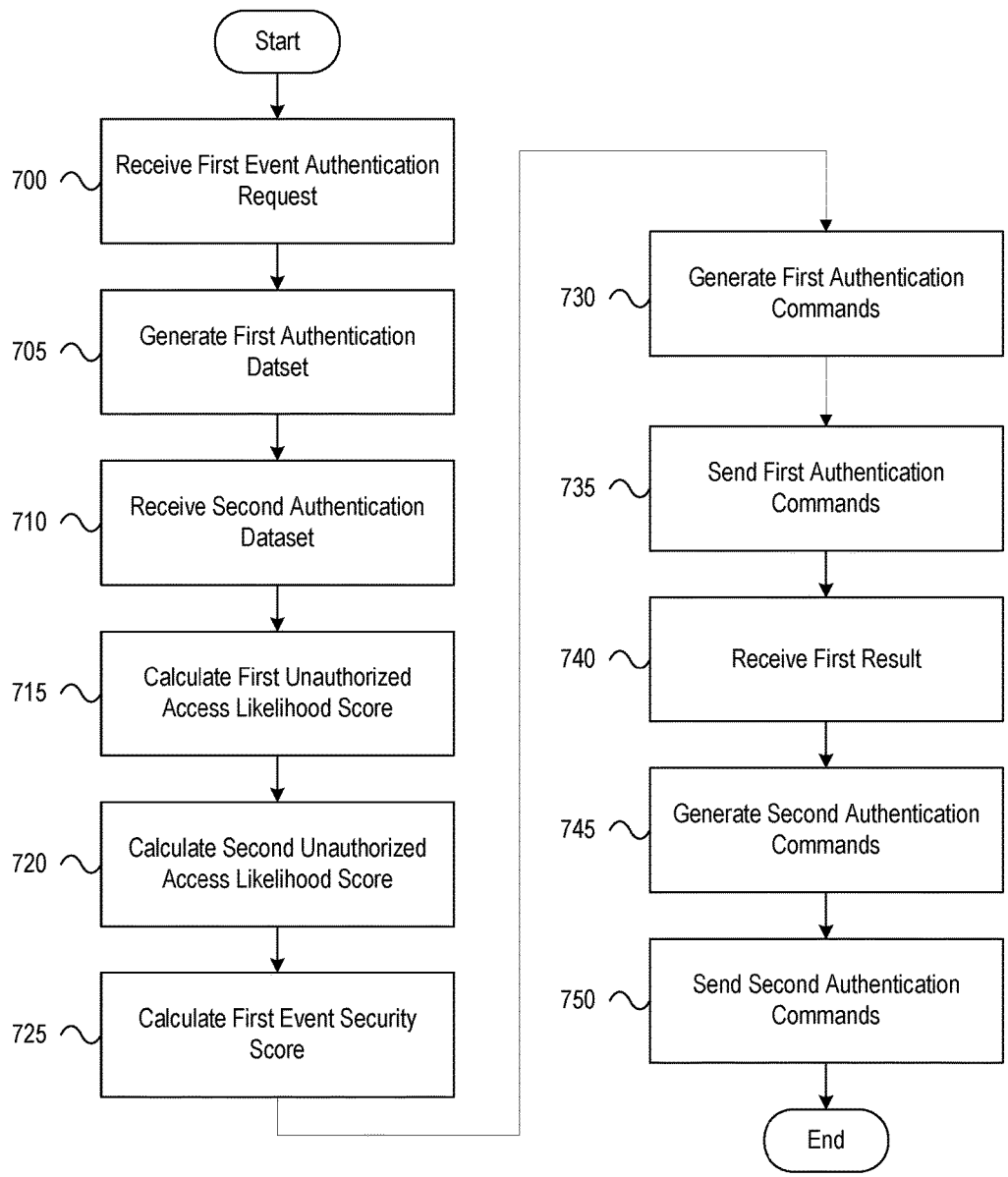
FIG. 7 depicts an illustrative method for multicomputer processing of an event authentication request with centralized event orchestration in accordance with one or more example embodiments.

FIG. 7 depicts an illustrative method for multicomputer processing of an event request from an event origination device with centralized event orchestration in accordance with one or more example embodiments. Referring to FIG. 7, at step 700, a computing platform having at least one processor, a memory, and a communication interface may receive, via the communication interface, a first request to authenticate a first event between a first client computing device and a second client computing device. At step 705, the computing platform may generate a first authentication dataset for the first event. At step 710, the computing platform may receive a second authentication dataset for the first event. At step 715, the computing platform may a first unauthorized access likelihood score for the first client computing device. At step 720, the computing platform may calculate a second unauthorized access likelihood score for the second client computing device. At step 725, the computing platform may calculate a first event security score for the first event. At step 730, the computing platform may generate one or more first authentication commands for the first event. At step 735, the computing platform may send the one or more first authentication commands to a first unauthorized access computing device. At step 740, the computing platform may receive a first results dataset for the first event. At step 745, the computing platform may generate one or more second authentication commands for the first event. At step 750, the computing platform may send the one or more second authentication commands to an event processing computing platform.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, from an event processing computing platform, a first request to authenticate a first event between a first client computing device and a second client computing device;
   generate, based on contents of the first request, a first authentication dataset, the first authentication dataset comprising first dynamic authentication data for the first client computing device and second dynamic authentication data for the second client computing device;
   receive, from an event authentication database, a second authentication dataset, the second authentication dataset comprising first historical authentication data for the first client computing device and second historical authentication data for the second client computing device;
   calculate a first unauthorized access likelihood score value for the first client computing device based on the first dynamic authentication data for the first client computing device and the first historical authentication data for the first client computing device;
   calculate a second unauthorized access likelihood score value for the second client computing device based on the second dynamic authentication data for the second client computing device and the second historical authentication data for the second client computing device;
calculate a first event security score for the first event based on the first unauthorized access likelihood score value for the first client computing device and the second unauthorized access likelihood score value for the second client computing device;
generate, based on the first event security score, one or more first event authentication commands directing a first unauthorized access computing device to execute a first unauthorized access analysis;
send, via the communication interface, to the first unauthorized access computing device, the one or more first event authentication commands directing the first unauthorized access computing platform to execute the first unauthorized access analysis;
receive, via the communication interface, from the first unauthorized access computing device, a first result of the first unauthorized access analysis;
generate, based on the first result of the first unauthorized access analysis, one or more second event authentication commands, wherein:
if the first result indicates that the first event is unauthorized, the one or more second event authentication commands direct the event processing computing platform to deny the first event; and
if the first result and a first set of authentication credentials indicate that the first event is authorized, the one or more second event authentication commands direct the event processing computing platform to authorize the first event; and
send, via the communication interface, to the event processing computing platform, the one or more second event authentication commands.

2. The computing platform of claim 1, wherein the first dynamic authentication data comprises a first alias associated with the first client computing device and the second dynamic authentication data comprises a second alias associated with the second client computing device.

3. The computing platform of claim 2, wherein the second authentication dataset further comprises previously authenticated events between the first alias and the second alias, or between the first client computing device and the second client computing device.

4. The computing platform of claim 3, wherein the first event security score is further based on the previously authenticated events between the first alias and the second alias or between the first client computing device and the second client computing device.

5. The computing platform of claim 2, wherein the first historical authentication data for the first client computing device comprises a first set of events associated with the first alias and a second set of events associated with the first client computing device.

6. The computing platform of claim 5, wherein calculating the first unauthorized access likelihood score value for the first client computing device comprises assigning a first weight to the first set of events and a second weight to the second set of events, wherein the second weight is higher than the first weight.

7. The computing platform of claim 1, wherein the generating, based on the first event security score, one or more first event authentication commands comprises generating, responsive to a determination that the first event security score is above a first threshold, the one or more first event authentication commands.

8. The computing platform of claim 7, further comprising, prior to generating the one or more second event authentication commands and responsive to a determination that the first result indicates that the first event is authorized:
sending a first authentication credentials request to the first client computing device; and
sending a second authentication credentials request to the second client computing device.

9. The computing platform of claim 8, further comprising:
receiving, in response to sending the first authentication credentials request, a first authentication credential from the first client computing device; and
receiving, in response to sending the second authentication credentials request, a second authentication credential from the second client computing device,
wherein the first set of authentication credentials comprises the first authentication credential and the second authentication credential.

10. The computing platform of claim 9, further comprising:
validating the first set of authentication credentials by comparing contents of the first authentication credential and contents of the second authentication credential with stored authentication data.

11. The computing platform of claim 1, the memory further storing computer-readable instructions that, when executed by the at least one processor, cause the computing platform to:
receive, via the communication interface, from the event processing computing platform, a second request to authenticate a second event between a third client computing device and a fourth client computing device;
generate, based on contents of the second request, a third authentication dataset, the third authentication dataset comprising third dynamic authentication data for the third client computing device and fourth dynamic authentication data for the fourth client computing device;
receive, from the event authentication database, a fourth authentication dataset, the fourth authentication dataset comprising third historical authentication data for the third client computing device and fourth historical authentication data for the fourth client computing device;
calculate a third unauthorized access likelihood score value for the third client computing device based on the third dynamic authentication data for the third client computing device and the third historical authentication data for the third client computing device;
calculate a fourth unauthorized access likelihood score value for the fourth client computing device based on the fourth dynamic authentication data for the fourth client computing device and the fourth historical authentication data for the fourth client computing device;
calculate a second event security score for the second event based on the third unauthorized access likelihood score value for the third client computing device and fourth unauthorized access likelihood score value for the fourth client computing device;
generate, based on the second event security score, one or more third event authentication commands directing a second unauthorized access computing device to execute a second unauthorized access analysis;
send, via the communication interface, to the second unauthorized access computing device, the one or more third event authentication commands directing the second unauthorized access computing platform to execute the second unauthorized access analysis;
receive, via the communication interface, from the second unauthorized access computing device, a second result of the second unauthorized access analysis;
generate, based on the second result of the second unauthorized access analysis, one or more fourth event authentication commands, wherein:
if the second result and a second set of authentication credentials indicate that the second event is authorized, the one or more fourth event authentication commands direct the event processing computing platform to authorize the second event; and
if the second result indicates that the second event is unauthorized, the one or more fourth event authentication commands direct the event processing computing platform to deny the second event; and
send, via the communication interface, to the event processing computing platform, the one or more fourth event authentication commands.

12. The computing platform of claim 11, wherein the third dynamic authentication data comprises a first alias associated with the third client computing device, and wherein the fourth dynamic authentication data comprises a second alias associated with the fourth client computing device.

13. The computing platform of claim 12, wherein the fourth authentication dataset further comprises previously authenticated events between the first alias and the second alias or between the third client computing device and the fourth client computing device.

14. The computing platform of claim 13, wherein the second event security score is further based on the previously authenticated events between the first alias and the second alias or between the third client computing device and the fourth client computing device.

15. The computing platform of claim 12, wherein the first historical authentication data for the third client computing device comprises a first set of events associated with the first alias and a second set of events associated with the third client computing device.

16. The computing platform of claim 15, wherein calculating the third unauthorized access likelihood score value for the third client computing device comprises assigning a first weight to the first set of events and a second weight to the second set of events, wherein the second weight is higher than the first weight.

17. The computing platform of claim 11, wherein the generating, based on the second event security score, one or more third event authentication commands comprises generating, responsive to a determination that the second event security score is above a threshold value, the one or more third event authentication commands.

18. The computing platform of claim 17, further comprising, prior to generating the one or more fourth event authentication commands and responsive to a determination that the second result indicates that the second event is authorized:
sending a first authentication credentials request to the third client computing device;
sending a second authentication credentials request to the fourth client computing device;
receiving, in response to sending the first authentication credentials request, a first authentication credential from the third client computing device; and
receiving, in response to sending the second authentication credentials request, a second authentication credential from the fourth client computing device,
wherein the second set of authentication credentials comprises the first authentication credential and the second authentication credential.

19. A method, comprising:
at a computing platform comprising at least one processor, memory, and a communication interface:
receiving, via the communication interface, from an event processing computing platform, a first request to authenticate a first event between a first client computing device and a second client computing device;
generating, based on contents of the first request, a first authentication dataset, the first authentication dataset comprising first dynamic authentication data for the first client computing device and second dynamic authentication data for the second client computing device;
receiving, from an event authentication database, a second authentication dataset, the second authentication dataset comprising first historical authentication data for the first client computing device and second historical authentication data for the second client computing device;
calculating a first unauthorized access likelihood score value for the first client computing device based on the first dynamic authentication data for the first client computing device and the first historical authentication data for the first client computing device;
calculating a second unauthorized access likelihood score value for the second client computing device based on the second dynamic authentication data for the second client computing device and the second historical authentication data for the second client computing device;
calculating a first event security score for the first event based on the first unauthorized access likelihood score value for the first client computing device and the second unauthorized access likelihood score value for the second client computing device;
generating, based on the first event security score, one or more first event authentication commands directing a first unauthorized access computing device to execute a first unauthorized access analysis;
sending, via the communication interface, to the first unauthorized access computing device, the one or more first event authentication commands directing the first unauthorized access computing platform to execute the first unauthorized access analysis;
receiving, via the communication interface, from the first unauthorized access computing device, a first result of the first unauthorized access analysis;
generating, based on the first result of the first unauthorized access analysis, one or more second event authentication commands, wherein:
if the first result and a set of authentication credentials indicate that the first event is authorized, the one or more second event authentication commands direct the event processing computing platform to authorize the first event; and
if the first result indicates that the first event is unauthorized, the one or more second event authentication commands direct the event processing computing platform to deny the first event; and
sending, via the communication interface, to the event processing computing platform, the one or more second event authentication commands.

20. One or more non-transitory computer-readable media storing instructions that, when executed by a computing platform comprising at least one processor, memory, and a communication interface, cause the computing platform to:
- receive, via the communication interface, from an event processing computing platform, a first request to authenticate a first event between a first client computing device and a second client computing device;
- generate, based on contents of the first request, a first authentication dataset, the first authentication dataset comprising first dynamic authentication data for the first client computing device and second dynamic authentication data for the second client computing device;
- receive, from an event authentication database, a second authentication dataset, the second authentication dataset comprising first historical authentication data for the first client computing device and second historical authentication data for the second client computing device;
- calculate a first unauthorized access likelihood score value for the first client computing device based on the first dynamic authentication data for the first client computing device and the first historical authentication data for the first client computing device;
- calculate a second unauthorized access likelihood score value for the second client computing device based on the second dynamic authentication data for the second client computing device and the second historical authentication data for the second client computing device;
- calculate a first event security score for the first event based on the first unauthorized access likelihood score value for the first client computing device and the second unauthorized access likelihood score value for the second client computing device;
- generate, based on the first event security score, one or more first event authentication commands directing a first unauthorized access computing device to execute a first unauthorized access analysis;
- send, via the communication interface, to the first unauthorized access computing device, the one or more first event authentication commands directing the first unauthorized access computing platform to execute the first unauthorized access analysis;
- receive, via the communication interface, from the first unauthorized access computing device, a first result of the first unauthorized access analysis;
- generate, based on the first result of the first unauthorized access analysis, one or more second event authentication commands, wherein:
  - if the first result and a set of authentication credentials indicate that the first event is authorized, the one or more second event authentication commands direct the event processing computing platform to authorize the first event; and
  - if the first result indicates that the first event is unauthorized, the one or more second event authentication commands direct the event processing computing platform to deny the first event; and
- send, via the communication interface, to the event processing computing platform, the one or more second event authentication commands.

* * * * *